United States Patent
Luo et al.

(10) Patent No.: US 8,638,684 B2
(45) Date of Patent: Jan. 28, 2014

(54) APERIODIC CHANNEL STATE INFORMATION REQUEST IN WIRELESS COMMUNICATION

(75) Inventors: Xiliang Luo, Northridge, CA (US); Xiaoxia Zhang, San Diego, CA (US); Peter Gaal, San Diego, CA (US); Hao Xu, San Diego, CA (US); Wanshi Chen, San Diego, CA (US); Juan Montojo, San Diego, CA (US); Tao Luo, San Diego, CA (US)

(73) Assignee: QUALCOMM, San Diego, CA (US)

( * ) Notice: Subject to any disclaimer, the term of this patent is extended or adjusted under 35 U.S.C. 154(b) by 257 days.

(21) Appl. No.: 13/072,617

(22) Filed: Mar. 25, 2011

(65) Prior Publication Data

US 2012/0076017 A1    Mar. 29, 2012

Related U.S. Application Data

(60) Provisional application No. 61/321,043, filed on Apr. 5, 2010.

(51) Int. Cl.
*H04W 24/00* (2009.01)
*H04L 12/26* (2006.01)

(52) U.S. Cl.
USPC .......................................... 370/252; 370/236

(58) Field of Classification Search
USPC .................. 370/236, 252, 329, 476
See application file for complete search history.

(56) References Cited

U.S. PATENT DOCUMENTS

| | | |
|---|---|---|
| 2007/0091817 A1 | 4/2007 | Yoon et al. |
| 2009/0116570 A1* | 5/2009 | Bala et al. ............... 375/260 |
| 2009/0147869 A1 | 6/2009 | Duan et al. |
| 2009/0207831 A1* | 8/2009 | Ihm et al. ............... 370/349 |
| 2009/0209261 A1 | 8/2009 | Kuri et al. |
| 2009/0225711 A1* | 9/2009 | Sammour et al. ............ 370/329 |
| 2010/0035555 A1* | 2/2010 | Bala et al. ................ 455/63.1 |
| 2010/0177649 A1* | 7/2010 | Ishii et al. ................ 370/252 |
| 2010/0202311 A1* | 8/2010 | Lunttila et al. ............ 370/252 |

(Continued)

FOREIGN PATENT DOCUMENTS

| | | |
|---|---|---|
| EP | 1901573 A1 | 3/2008 |
| EP | 1909518 A1 | 4/2008 |
| WO | WO-2007015529 A1 | 2/2007 |
| WO | WO-2007023515 A1 | 3/2007 |

OTHER PUBLICATIONS

International Search Report and Written Opinion—PCT/US2011/031301—ISA/EPO—Jun. 16, 2011.

*Primary Examiner* — Brian D Nguyen
(74) *Attorney, Agent, or Firm* — Liem T. Do

(57) ABSTRACT

A method, computer program product, and apparatus are provided in which a request for a channel state information (CSI) report is received on a component carrier of a plurality of component carriers. The request indicates a set of component carriers of the plurality of component carriers for which to provide the CSI report. In addition, a CSI report including feedback for each of the indicated component carriers in the set of component carriers is transmitted. A method, computer program product, and apparatus are provided in which a request for a CSI report on a component carrier of a plurality of component carriers is transmitted. The request indicates a set of component carriers of the plurality of component carriers for which to receive the CSI report. In addition, a CSI report including feedback for each of the indicated component carriers in the set of component carriers is received.

56 Claims, 29 Drawing Sheets

(56) References Cited

U.S. PATENT DOCUMENTS

| | | | |
|---|---|---|---|
| 2010/0232364 A1* | 9/2010 | Hsu | 370/328 |
| 2010/0303039 A1* | 12/2010 | Zhang et al. | 370/331 |
| 2011/0019637 A1* | 1/2011 | Ojala et al. | 370/329 |
| 2011/0242982 A1* | 10/2011 | Lunttila et al. | 370/241 |

* cited by examiner

| Cyclic Shift Field | 000 | 001 | 010 | 011 | 100 | 101 | 110 | 111 |
|---|---|---|---|---|---|---|---|---|
| Downlink Component Carriers | 0 | 1 | 2 | 3 | 4 | Reserved | Reserved | Reserved |

APERIODIC CHANNEL STATE INFORMATION REQUEST IN WIRELESS COMMUNICATION

CROSS-REFERENCE TO RELATED APPLICATION

This application claims the benefit of U.S. Provisional Application Ser. No. 61/321,043, entitled "Method and Apparatus that Facilitates Aperiodic Channel Quality Indicator Requests in Long Term Evolution Systems" and filed on Apr. 5, 2010, which is expressly incorporated by reference herein in its entirety.

BACKGROUND

1. Field

The present disclosure relates generally to communication systems, and more particularly, to aperiodic channel state information (CSI) requests in wireless communication.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

In LTE Release 10 (Rel-10), carrier aggregation is supported with multiple component carriers (CCs) in the DL/UL. If one UL CC is responsible for aperiodic CSI reporting for multiple CCs, a UE needs be able to determine for which DL CCs to report the CSI. As such, there is a need for methods and apparatuses for conveying a set of CCs for which a CSI report should be provided.

SUMMARY

In an aspect of the disclosure, a method, a computer program product, and an apparatus are provided in which a request for a CSI report is received on a CC of a plurality of CCs. The request indicates a set of CCs of the plurality of CCs for which to provide the CSI report. In addition, a CSI report including feedback for each of the indicated CCs in the set of CCs is transmitted.

In an aspect of the disclosure, a method, a computer program product, and an apparatus are provided in which a request for a CSI report on a CC of a plurality of CCs is transmitted. The request indicates a set of CCs of the plurality of CCs for which to receive the CSI report. In addition, a CSI report including feedback for each of the indicated CCs in the set of CCs is received.

BRIEF DESCRIPTION OF THE DRAWINGS

FIG. 14 is a diagram illustrating a third exemplary method for conveying the set of CCs for which the CSI report may be provided.

DETAILED DESCRIPTION

Figure 1:
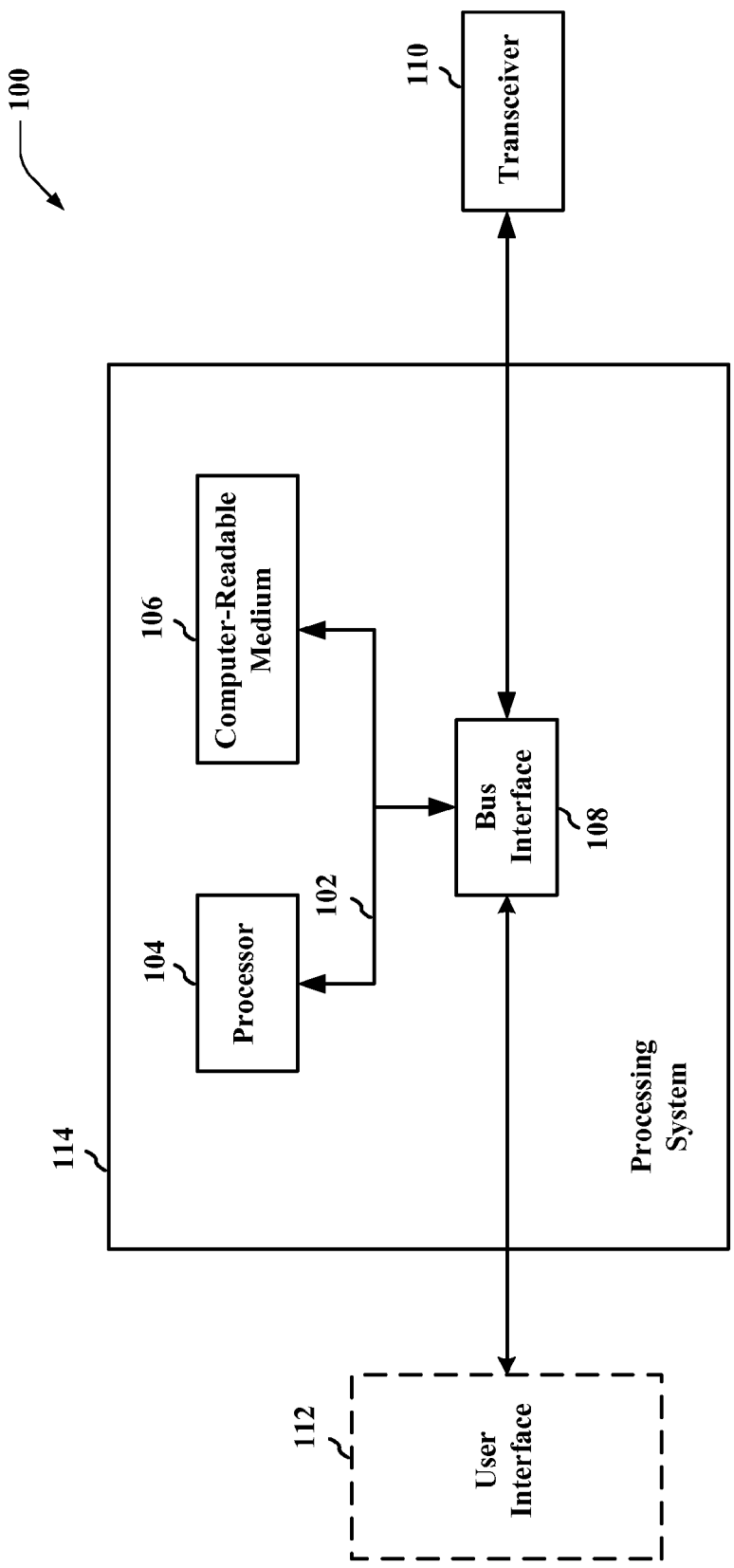
FIG. 1 is a diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an example of a hardware implementation for an apparatus 100 employing a processing system 114. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
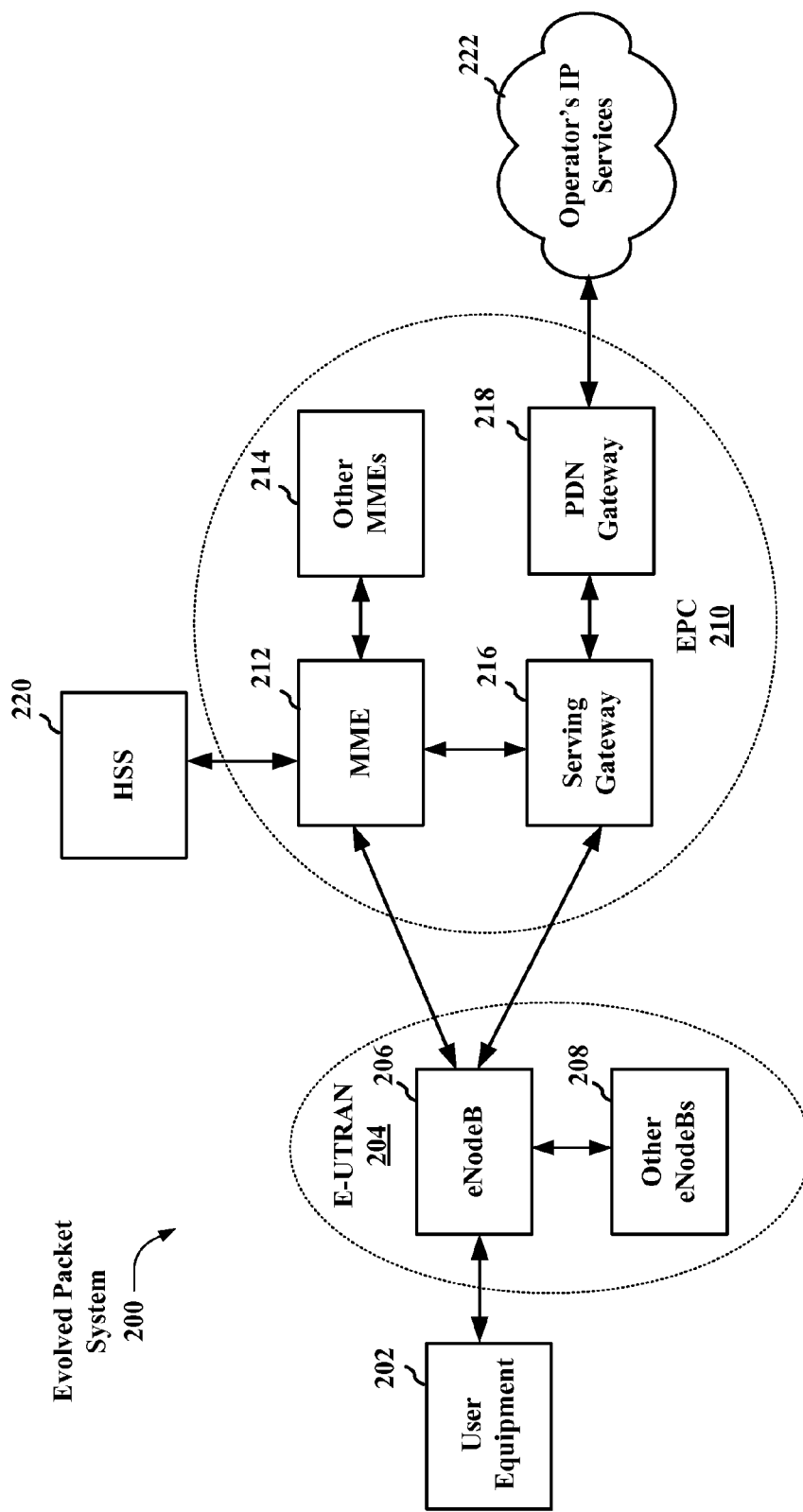
FIG. 2 is a diagram illustrating an example of a network architecture.

FIG. 2 is a diagram illustrating an LTE network architecture 200 employing various apparatuses (See FIG. 1). The LTE network architecture 200 may be referred to as an Evolved Packet System (EPS) 200. The EPS 200 may include one or more user equipment (UE) 202, an Evolved UMTS Terrestrial Radio Access Network (E-UTRAN) 204, an Evolved Packet Core (EPC) 210, a Home Subscriber Server (HSS) 220, and an Operator's IP Services 222. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 206 and other eNBs 208. The eNB 206 provides user and control plane protocol terminations toward the UE 202. The eNB 206 may be connected to the other eNBs 208 via an X2 interface (i.e., backhaul). The eNB 206 may also be referred to by those skilled in the art as a base station, a base transceiver station, a radio base station, a radio transceiver, a transceiver function, a basic service set (BSS), an extended service set (ESS), or some other suitable terminology. The eNB 206 provides an access point to the EPC 210 for a UE 202. Examples of UEs 202 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet or any other similar functioning device. The UE 202 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 206 is connected by an S1 interface to the EPC 210. The EPC 210 includes a Mobility Management Entity (MME) 212, other MMEs 214, a Serving Gateway 216, and a Packet Data Network (PDN) Gateway 218. The MME 212 is the control node that processes the signaling between the UE 202 and the EPC 210. Generally, the MME 212 provides bearer and connection management. All user IP packets are transferred through the Serving Gateway 216, which itself is connected to the PDN Gateway 218. The PDN Gateway 218 provides UE IP address allocation as well as other functions. The PDN Gateway 218 is connected to the Operator's IP Services 222. The Operator's IP Services 222 include the Internet, the Intranet, an IP Multimedia Subsystem (IMS), and a PS Streaming Service (PSS).

Figure 3:
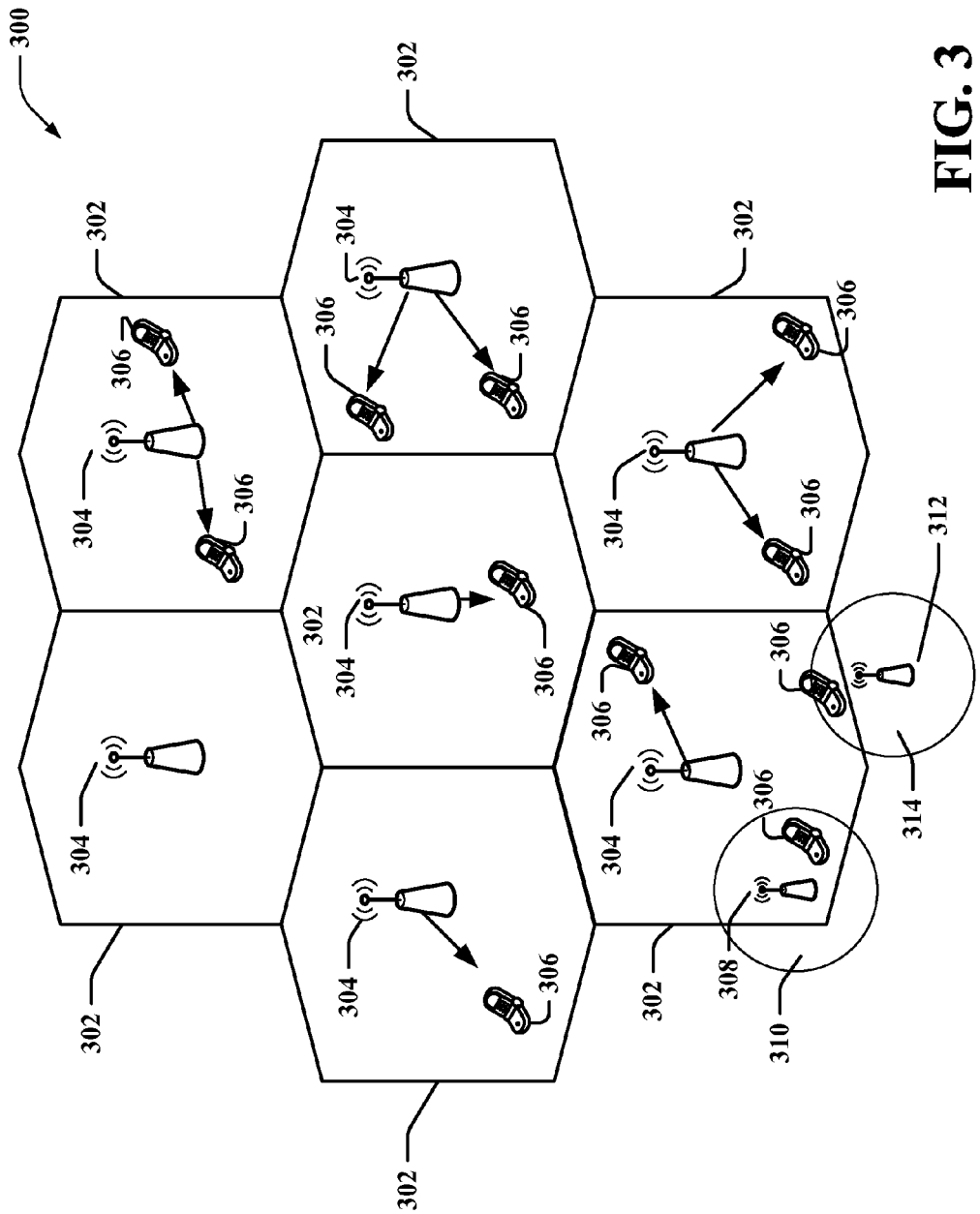
FIG. 3 is a diagram illustrating an example of an access network.

FIG. 3 is a diagram illustrating an example of an access network in an LTE network architecture. In this example, the access network 300 is divided into a number of cellular regions (cells) 302. One or more lower power class eNBs 308, 312 may have cellular regions 310, 314, respectively, that overlap with one or more of the cells 302. The lower power class eNBs 308, 312 may be femto cells (e.g., home eNBs (HeNBs)), pico cells, or micro cells. A higher power class or macro eNB 304 is assigned to a cell 302 and is configured to provide an access point to the EPC 210 for all the UEs 306 in the cell 302. There is no centralized controller in this example of an access network 300, but a centralized controller may be used in alternative configurations. The eNB 304 is responsible for all radio related functions including radio bearer control, admission control, mobility control, scheduling, security, and connectivity to the serving gateway 216 (see FIG. 2).

The modulation and multiple access scheme employed by the access network 300 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNB 304 may have multiple antennas supporting MIMO technology. The use of MIMO technology enables the eNB 304 to exploit the spatial domain to support spatial multiplexing, beamforming, and transmit diversity.

Spatial multiplexing may be used to transmit different streams of data simultaneously on the same frequency. The data steams may be transmitted to a single UE 306 to increase the data rate or to multiple UEs 306 to increase the overall system capacity. This is achieved by spatially precoding each data stream (i.e., applying a scaling of an amplitude and a phase) and then transmitting each spatially precoded stream through multiple transmit antennas on the downlink. The spatially precoded data streams arrive at the UE(s) 306 with different spatial signatures, which enables each of the UE(s) 306 to recover the one or more data streams destined for that UE 306. On the uplink, each UE 306 transmits a spatially precoded data stream, which enables the eNB 304 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PARR).

Figure 4:
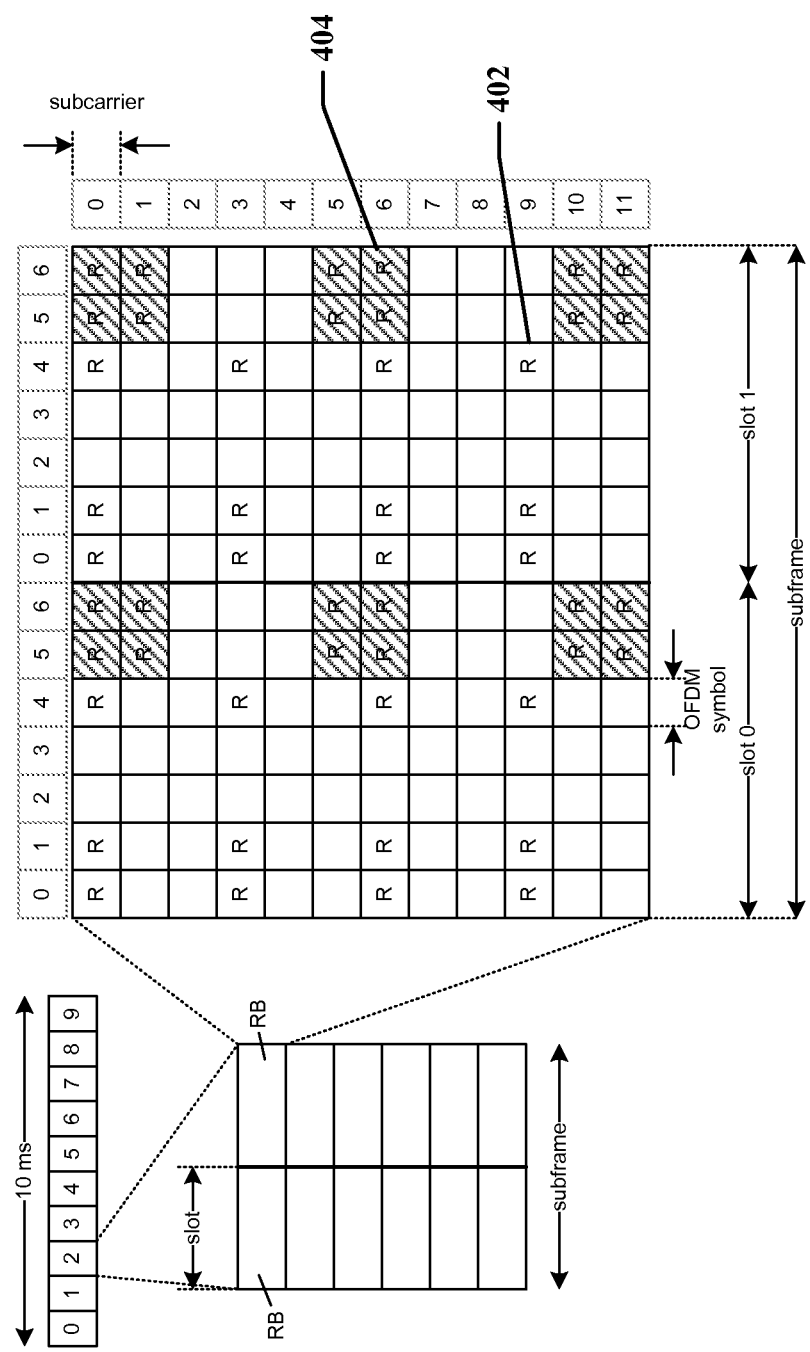
FIG. 4 is a diagram illustrating an example of a frame structure for use in an access network.

Various frame structures may be used to support the DL and UL transmissions. An example of a DL frame structure will now be presented with reference to FIG. 4. However, as those skilled in the art will readily appreciate, the frame structure for any particular application may be different depending on any number of factors. In this example, a frame (10 ms) is divided into 10 equally sized sub-frames. Each sub-frame includes two consecutive time slots.

A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. Some of the resource elements, as indicated as R 402, 404, include DL reference signals (DL-RS). The DL-RS include Cell-specific RS (CRS) (also sometimes called common RS) 402 and UE-specific RS (UE-RS) 404. UE-RS 404 are transmitted only on the resource blocks upon which the corresponding physical downlink shared channel (PDSCH) is mapped. The number of bits carried by each resource element depends on the modulation scheme. Thus, the more resource blocks that a UE receives and the higher the modulation scheme, the higher the data rate for the UE.

Figure 5:
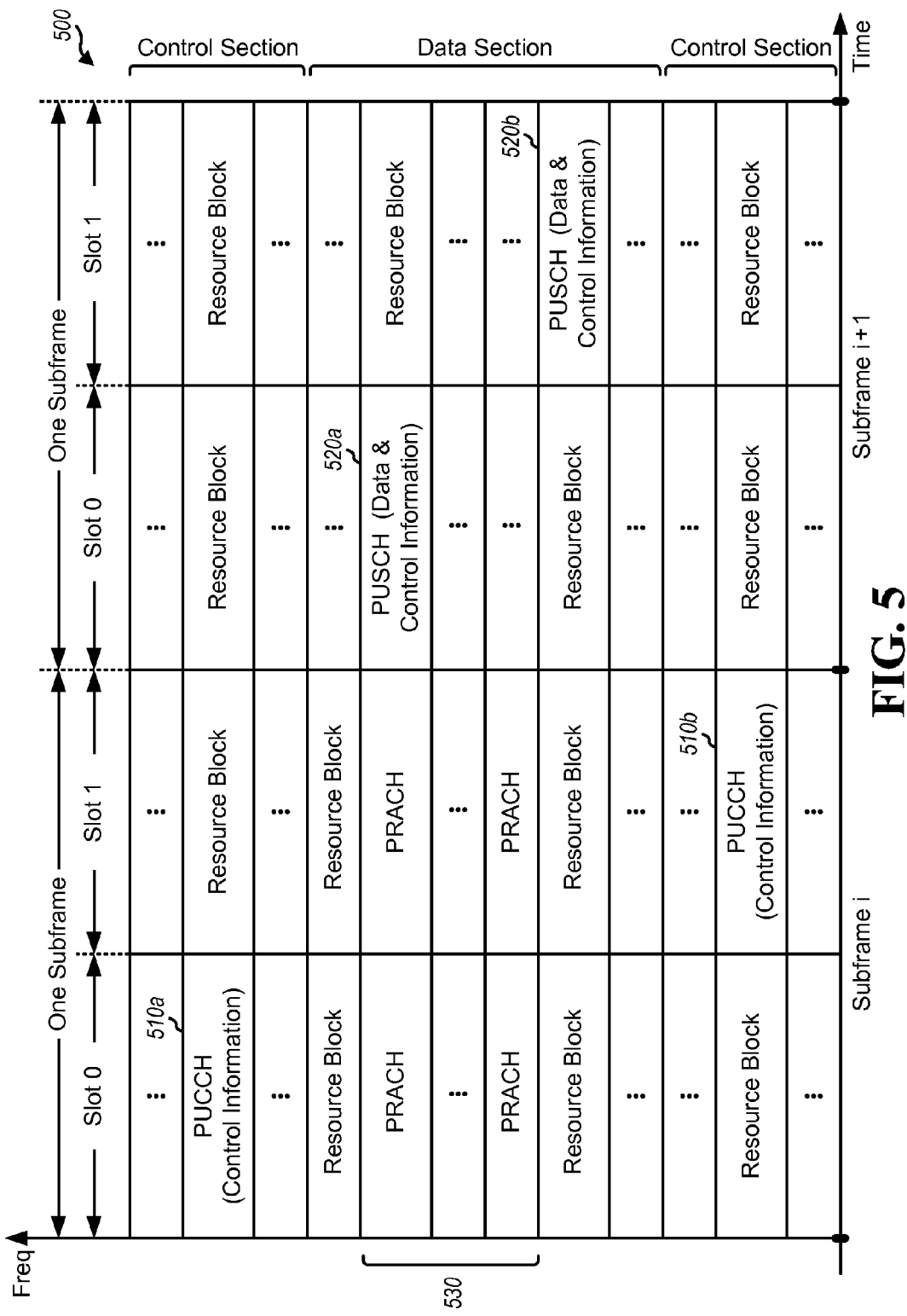
FIG. 5 shows an exemplary format for the UL in LTE.

An example of a UL frame structure 500 will now be presented with reference to FIG. 5. FIG. 5 shows an exemplary format for the UL in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 5 results in the data section including contiguous subcarriers, which may allow a single UE to be assigned all of the contiguous subcarriers in the data section.

A UE may be assigned resource blocks 510*a*, 510*b* in the control section to transmit control information to an eNB. The UE may also be assigned resource blocks 520*a*, 520*b* in the data section to transmit data to the eNB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. A UL transmission may span both slots of a subframe and may hop across frequency as shown in FIG. 5.

As shown in FIG. 5, a set of resource blocks may be used to perform initial system access and achieve UL synchronization in a physical random access channel (PRACH) 530. The PRACH 530 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) and a UE can make only a single PRACH attempt per frame (10 ms).

The PUCCH, PUSCH, and PRACH in LTE are described in 3GPP TS 36.211, entitled "Evolved Universal Terrestrial Radio Access (E-UTRA); Physical Channels and Modulation," which is publicly available.

The radio protocol architecture may take on various forms depending on the particular application. An example for an LTE system will now be presented with reference to FIG. 6.

Figure 6:
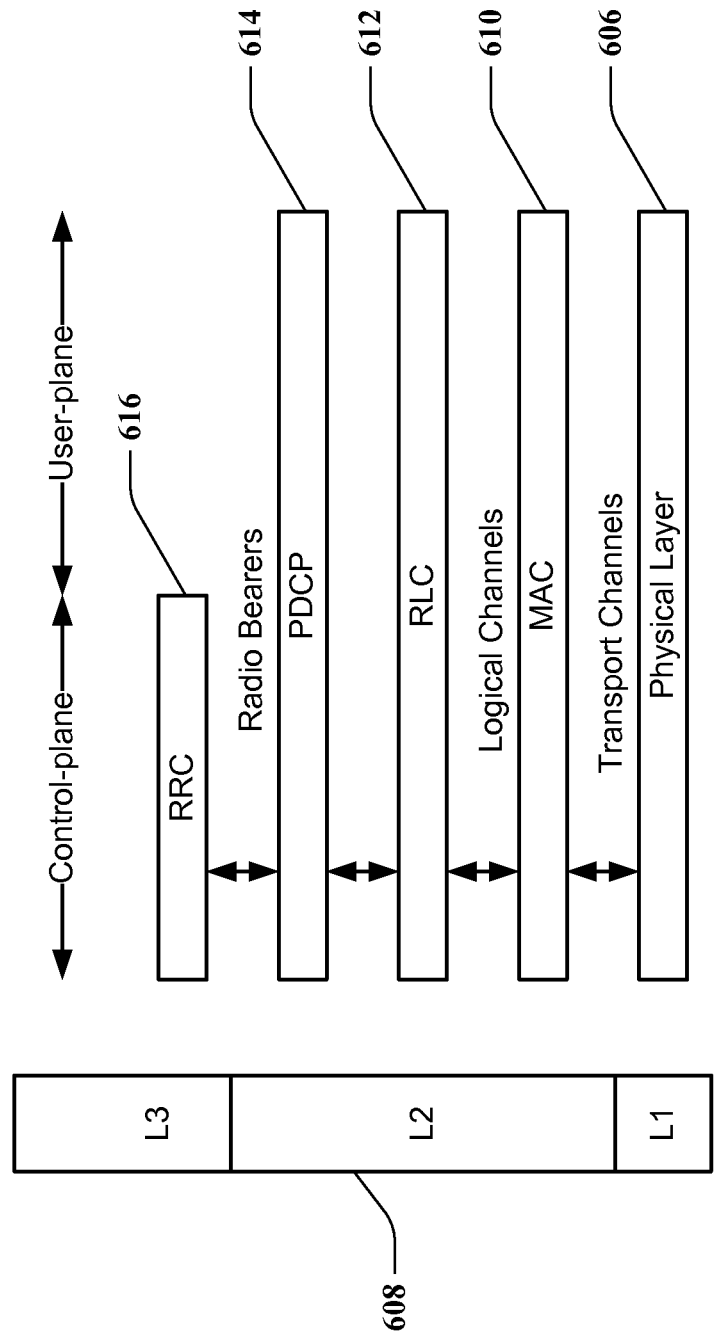
FIG. 6 is a diagram illustrating an example of a radio protocol architecture for user and control plane.

FIG. 6 is a conceptual diagram illustrating an example of the radio protocol architecture for the user and control planes.

Turning to FIG. 6, the radio protocol architecture for the UE and the eNB is shown with three layers: Layer 1, Layer 2, and Layer 3. Layer 1 is the lowest layer and implements various physical layer signal processing functions. Layer 1 will be referred to herein as the physical layer 606. Layer 2 (L2 layer) 608 is above the physical layer 606 and is responsible for the link between the UE and eNB over the physical layer 606.

In the user plane, the L2 layer 608 includes a media access control (MAC) sublayer 610, a radio link control (RLC) sublayer 612, and a packet data convergence protocol (PDCP) 614 sublayer, which are terminated at the eNB on the network side. Although not shown, the UE may have several upper layers above the L2 layer 608 including a network layer (e.g., IP layer) that is terminated at the PDN gateway 208 (see FIG. 2) on the network side, and an application layer that is terminated at the other end of the connection (e.g., far end UE, server, etc.).

The PDCP sublayer 614 provides multiplexing between different radio bearers and logical channels. The PDCP sublayer 614 also provides header compression for upper layer data packets to reduce radio transmission overhead, security by ciphering the data packets, and handover support for UEs between eNBs. The RLC sublayer 612 provides segmentation and reassembly of upper layer data packets, retransmission of lost data packets, and reordering of data packets to compensate for out-of-order reception due to hybrid automatic repeat request (HARQ). The MAC sublayer 610 provides multiplexing between logical and transport channels. The MAC sublayer 610 is also responsible for allocating the various radio resources (e.g., resource blocks) in one cell among the UEs. The MAC sublayer 610 is also responsible for HARQ operations.

In the control plane, the radio protocol architecture for the UE and eNB is substantially the same for the physical layer 606 and the L2 layer 608 with the exception that there is no header compression function for the control plane. The control plane also includes a radio resource control (RRC) sublayer 616 in Layer 3. The RRC sublayer 616 is responsible for obtaining radio resources (i.e., radio bearers) and for configuring the lower layers using RRC signaling between the eNB and the UE.

Figure 7:
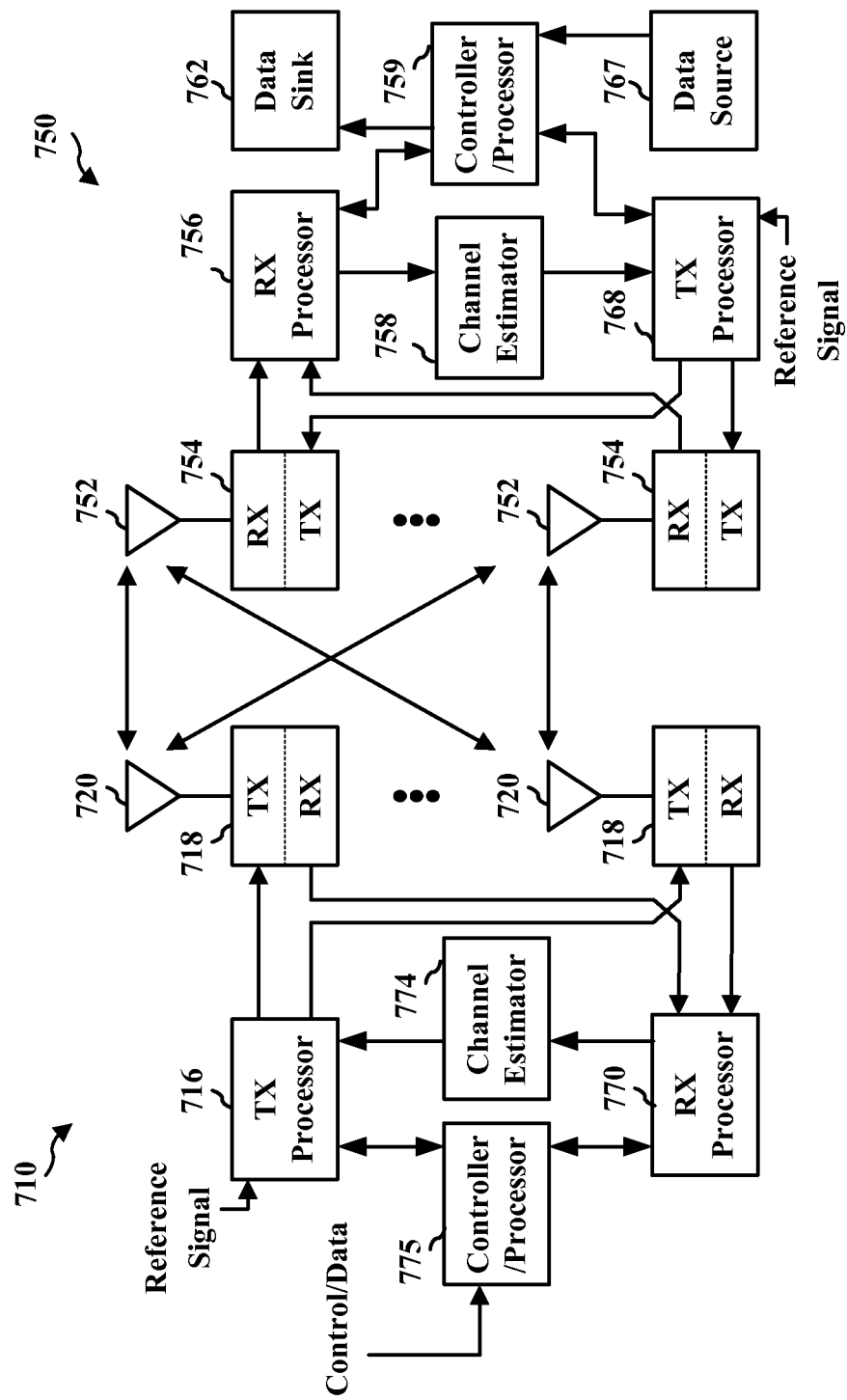
FIG. 7 is a diagram illustrating an example of an evolved Node B and user equipment in an access network.

FIG. 7 is a block diagram of an eNB 710 in communication with a UE 750 in an access network. In the DL, upper layer packets from the core network are provided to a controller/processor 775. The controller/processor 775 implements the functionality of the L2 layer described earlier in connection with FIG. 6. In the DL, the controller/processor 775 provides header compression, ciphering, packet segmentation and reordering, multiplexing between logical and transport channels, and radio resource allocations to the UE 750 based on various priority metrics. The controller/processor 775 is also responsible for HARQ operations, retransmission of lost packets, and signaling to the UE 750.

The TX processor 716 implements various signal processing functions for the L1 layer (i.e., physical layer). The signal processing functions includes coding and interleaving to facilitate forward error correction (FEC) at the UE 750 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 774 may be used to determine the coding and modulation scheme, as well as for spatial processing. The channel estimate may be derived from a reference signal and/or channel condition feedback transmitted by the UE 750. Each spatial stream is then provided to a different antenna 720 via a separate transmitter 718TX. Each transmitter 718TX modulates an RF carrier with a respective spatial stream for transmission.

At the UE 750, each receiver 754RX receives a signal through its respective antenna 752. Each receiver 754RX recovers information modulated onto an RF carrier and provides the information to the receiver (RX) processor 756.

The RX processor 756 implements various signal processing functions of the L1 layer. The RX processor 756 performs spatial processing on the information to recover any spatial streams destined for the UE 750. If multiple spatial streams are destined for the UE 750, they may be combined by the RX processor 756 into a single OFDM symbol stream. The RX processor 756 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 710. These soft decisions may be based on channel estimates computed by the channel estimator 758. The soft decisions are then decoded and deinterleaved to recover the data and control signals that were originally transmitted by the eNB 710 on the physical channel. The data and control signals are then provided to the controller/processor 759.

The controller/processor 759 implements the L2 layer described earlier in connection with FIG. 6. In the UL, the control/processor 759 provides demultiplexing between transport and logical channels, packet reassembly, deciphering, header decompression, control signal processing to recover upper layer packets from the core network. The upper layer packets are then provided to a data sink 762, which represents all the protocol layers above the L2 layer. Various control signals may also be provided to the data sink 762 for L3 processing. The controller/processor 759 is also responsible for error detection using an acknowledgement (ACK) and/or negative acknowledgement (NACK) protocol to support HARQ operations.

In the UL, a data source 767 is used to provide upper layer packets to the controller/processor 759. The data source 767 represents all protocol layers above the L2 layer (L2). Similar to the functionality described in connection with the DL transmission by the eNB 710, the controller/processor 759 implements the L2 layer for the user plane and the control plane by providing header compression, ciphering, packet segmentation and reordering, and multiplexing between logical and transport channels based on radio resource allocations by the eNB 710. The controller/processor 759 is also responsible for HARQ operations, retransmission of lost packets, and signaling to the eNB 710.

Channel estimates derived by a channel estimator 758 from a reference signal or feedback transmitted by the eNB 710 may be used by the TX processor 768 to select the appropriate coding and modulation schemes, and to facilitate spatial processing. The spatial streams generated by the TX processor 768 are provided to different antenna 752 via separate transmitters 754TX. Each transmitter 754TX modulates an RF carrier with a respective spatial stream for transmission.

The UL transmission is processed at the eNB 710 in a manner similar to that described in connection with the receiver function at the UE 750. Each receiver 718RX receives a signal through its respective antenna 720. Each receiver 718RX recovers information modulated onto an RF carrier and provides the information to a RX processor 770. The RX processor 770 implements the L1 layer.

The controller/processor 759 implements the L2 layer described earlier in connection with FIG. 6. In the UL, the control/processor 759 provides demultiplexing between transport and logical channels, packet reassembly, deciphering, header decompression, control signal processing to recover upper layer packets from the UE 750. Upper layer packets from the controller/processor 775 may be provided to the core network. The controller/processor 759 is also responsible for error detection using an ACK and/or NACK protocol to support HARQ operations.

In one configuration, the processing system 114 described in relation to FIG. 1 includes the eNB 710. In particular, the processing system 114 includes the TX processor 716, the RX processor 770, and the controller/processor 775. In one configuration, the processing system 114 described in relation to FIG. 1 includes the UE 750. In particular, the processing system 114 includes the TX processor 768, the RX processor 756, and the controller/processor 759.

Figure 8:
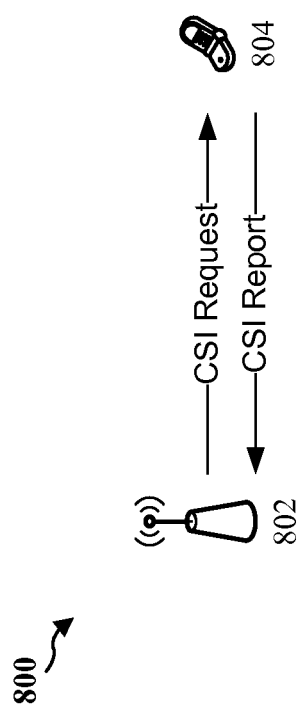
FIG. 8 is a diagram illustrating an aperiodic CSI request in LTE.

FIG. 8 is a diagram 800 illustrating an aperiodic channel-state information (CSI) request in LTE. As shown in FIG. 8, an eNodeB 802 sends a CSI request as part of DL control information (DCI) in an UL grant on the physical DL control channel (PDCCH) to a UE 804. The CSI request requests the UE 804 to determine the CSI and to report the CSI back to the eNodeB 802 using the PUSCH. The CSI includes channel quality indictor (CQI), precoding matrix indicator (PMI), and rank index (RI) feedback.

Figure 9:
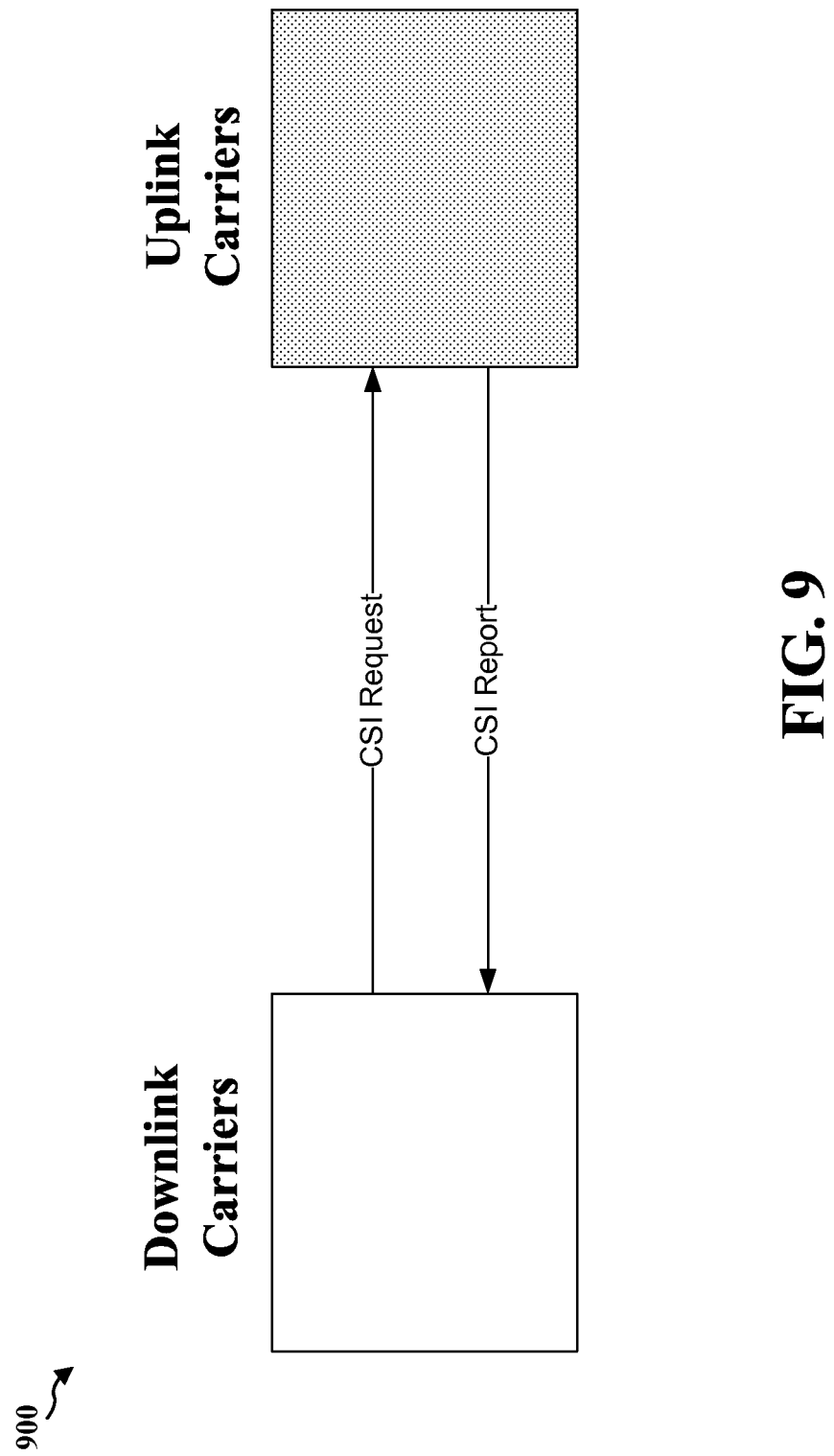
FIG. 9 is a diagram illustrating an aperiodic CSI request in LTE.

FIG. 9 is a diagram 900 illustrating an aperiodic CSI request in LTE. In LTE Rel-8, DCI format 0 includes a one bit CSI request field (a.k.a. CQI request field). Because there is only one DL CC in LTE Rel-8, whenever the CSI request bit is set to 1 for a CSI request received on the DL CC, the UE performs aperiodic CSI reporting for the DL CC using the PUSCH.

Figure 10:
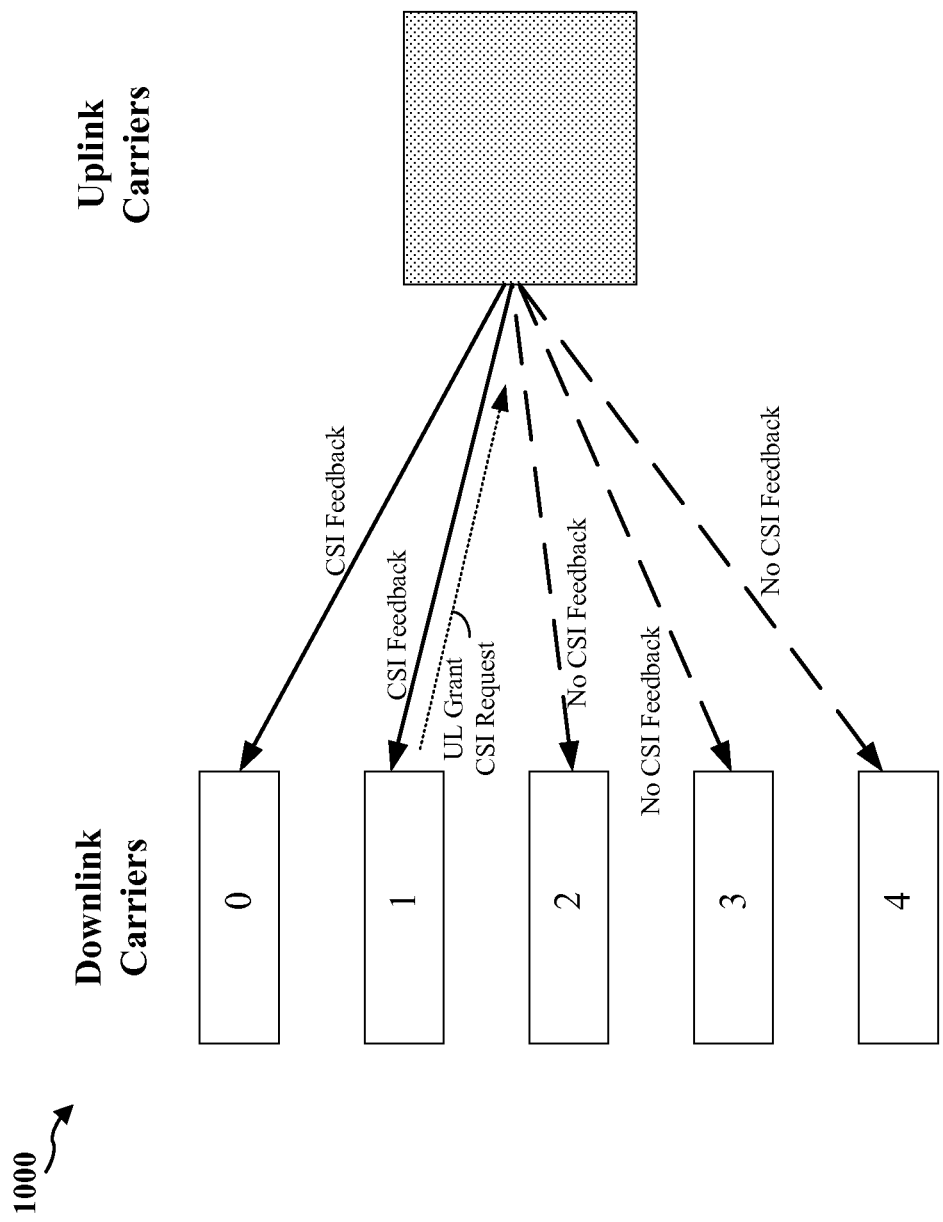
FIG. 10 is a diagram illustrating an exemplary method for aperiodic CSI requests.

FIG. 10 is a diagram 1000 illustrating an exemplary method for aperiodic CSI requests. In LTE Rel-10, carrier aggregation is supported with up to 5 CCs in the DL/UL. If one UL CC is responsible for aperiodic CSI reporting for multiple CCs, the UE 804 must be able to determine for which DL CCs to report CSI. In an exemplary method, the eNodeB 802 transmits a request for a CSI report on a CC of a plurality of CCs. The UE 804 receives the request for the CSI report on the CC of the plurality of CCs. The request indicates a set of CCs of the plurality of CCs for which the eNodeB 802 should receive the CSI report and for which the UE should provide the CSI report. The UE 804 transmits the CSI report including feedback for each of the indicated CCs in the set of CCs. The eNodeB 802 receives the CSI report including feedback for each of the indicated CCs in the set of CCs. For example, the eNodeB 802 may transmit a CSI request in an UL grant on the PDCCH of CC1 of the plurality of CCs including CC0, CC1, CC2, CC3, and CC4. The UE 804 receives the CSI request on CC1. The request may indicate that the eNodeB 802 would like to receive and the UE 804 should provide CSI for the set of CCs that includes CC0 and CC1. The UE 804 determines the CSI for the CCs in the set of CCs and transmits the CSI report including the CSI to the eNodeB 802.

Figure 11:
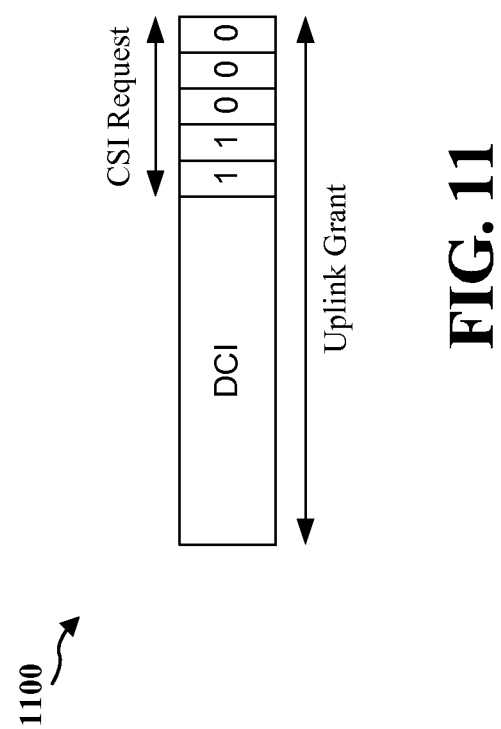
FIG. 11 is a diagram illustrating a first exemplary method for conveying the set of CCs for which the CSI report may be provided.

FIG. 11 is a diagram 1100 illustrating a first exemplary method for conveying the set of CCs for which the CSI report should be provided. According to the method, in a new DCI format for UL scheduling in LTE-A, an n-bit bitmap may indicate whether a particular DL CC requires an aperiodic CSI report. The bitmap has n bits for indicating which of n CCs requires an aperiodic CSI report. As such, if carrier aggregation is supported with up to 5 CCs, then n=5 and the new DCI format would include a 5-bit bitmap for indicating which of the 5 DL CCs requires an aperiodic CSI report. As shown in FIG. 11, the bitmap can be set to 11000, such that the first bit indicates that CC0 requires an aperiodic CSI report, the second bit indicates that CC1 requires an aperiodic CSI report, the third bit indicates that CC2 does not require an aperiodic CSI report, the fourth bit indicates that CC3 does not require an aperiodic CSI report, and the fifth bit indicates that CC4 does not require an aperiodic CSI report.

Figure 12:
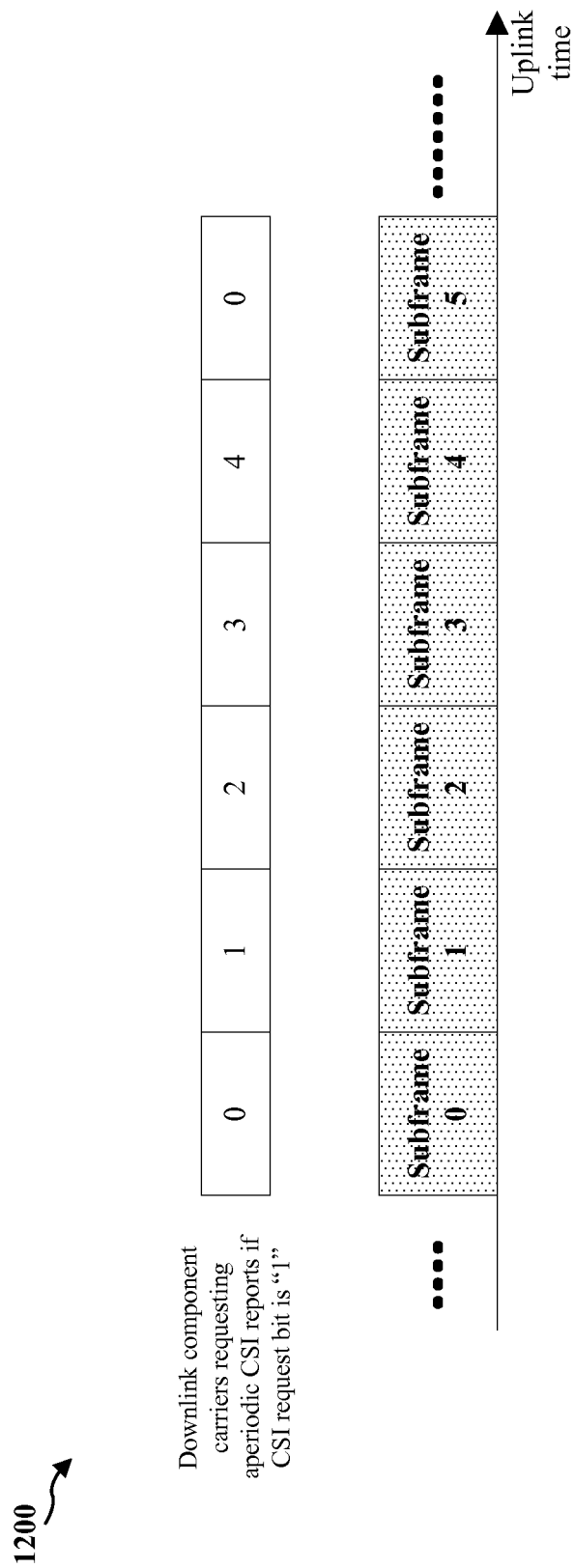
FIG. 12 is a first diagram illustrating a second exemplary method for conveying the set of CCs for which the CSI report may be provided.

FIG. 12 is a first diagram 1200 illustrating a second exemplary method for conveying the set of CCs for which the CSI report should be provided. According to the method, the UE 804 determines the set of CCs for which the CSI report should be provided based on an UL subframe number and/or a system frame number (SFN) for the UL grant. Each of the UL subframe numbers is mapped to a set of CCs. The set of CCs for any particular UL subframe number may vary based on the SFN so as not to be repetitive each radio frame. As such, when the bit in the CSI request is set to 1 in the UL grant, the UE 804 determines the CSI and sends the CSI report for the DL CCs mapped to the particular UL subframe number. As shown in FIG. 12, if the UL grant is for sending PUSCH in subframe 0, 1, 2, 3, 4, or 5, the UE 804 provides a CSI report for CC0, CC1, CC2, CC3, CC4, or CC0, respectively. Rather than being based on the subframe for which the UL grant applies, the set of CCs may be based on the subframe at which the UL grant is received. For example, if the UL grant is received in subframe k, the UE 804 may determine the set of CCs for which to provide the CSI report based on the CCs mapped to subframe k. In another configuration, if the UL grant is for sending PUSCH in subframe k+4, the UE 804 may determine the set of CCs for which to provide the CSI report based on the CCs mapped to subframe k+4. Other configurations are also possible.

Figure 13:
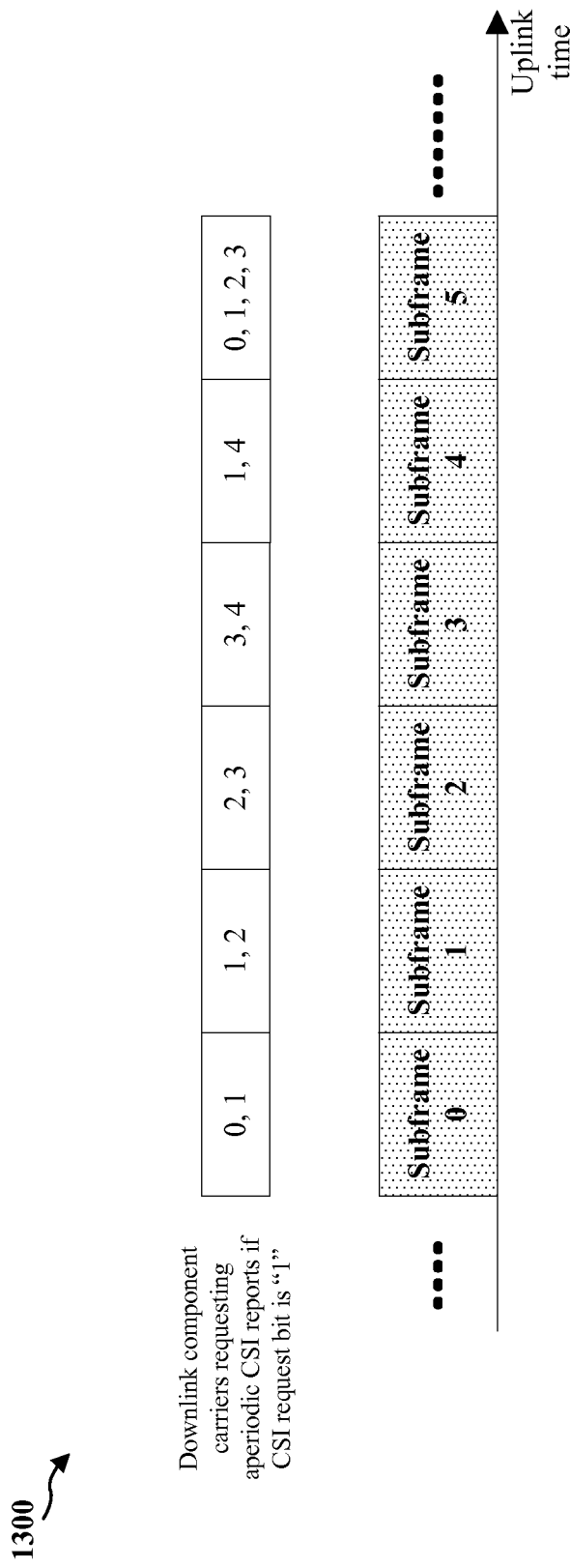
FIG. 13 is a second diagram illustrating the second exemplary method for conveying the set of CCs for which the CSI report may be provided.

FIG. 13 is a second diagram 1300 illustrating the second exemplary method for conveying the set of CCs for which the CSI report should be provided. As shown in FIG. 13, each UL subframe number may be mapped to more than one CC, which may also vary based on the SFN. As such, for a particular SFN, the UL subframe 0 may be mapped to the CCs 0, 1; the UL subframe 1 may be mapped to the CCs 1, 2; the UL subframe 2 may be mapped to the CCs 2, 3; the UL subframe 3 may be mapped to the CCs 3, 4; the UL subframe 4 may be mapped to the CCs 1, 4; and the subframe 5 may be mapped to the CCs 0, 1, 2, 3.

FIG. 14 is a diagram 1400 illustrating a third exemplary method for conveying the set of CCs for which the CSI report should be provided. According to the method, the set of CCs for which the CSI report should be provided is mapped by the 3-bit cyclic shift for demodulation reference signals (DM-RS) in the DCI for the UL grant. As such, when the bit in the CSI request is set to 1 in the UL grant, the UE 804 determines the set of CCs for which to provide the CSI report based on the CCs that are mapped to the particular cyclic shift that is received in the DCI within the UL grant. For example, the set of CCs may be defined for each of the eight possible cyclic shifts as shown in FIG. 14. As such, the cyclic shifts 000, 001, 010, 011, and 100, may be mapped to CCs 0, 1, 2, 3, and 4, respectively. Some of the cyclic shifts (e.g., 101, 110, 111 in FIG. 14) may not be mapped to CCs and may be reserved. The reserve entries may be defined when there is need to send multiple aperiodic CSI reports for multiple DL CCs. As shown in FIG. 14, if the UE 804 receives a cyclic shift of 010 with the CSI of the UL grant and the bit in the CSI request is set to 1, the UE 804 will determine the CSI for the CC2 and transmit a CSI report including the determined DCI to the eNodeB 802.

In one configuration, if there is no transport block for scheduled UL associated with the aperiodic CSI report, the reserved modulation and coding scheme (MCS) indexes 29, 30, 31 can be utilized together with the cyclic shift for DM-RS to define the set of DL CCs for which to provide the CSI report. As such, with eight cyclic shift values and three different MCS indexes, there are 24 different possible sets of CCs that may be defined.

Figure 15:
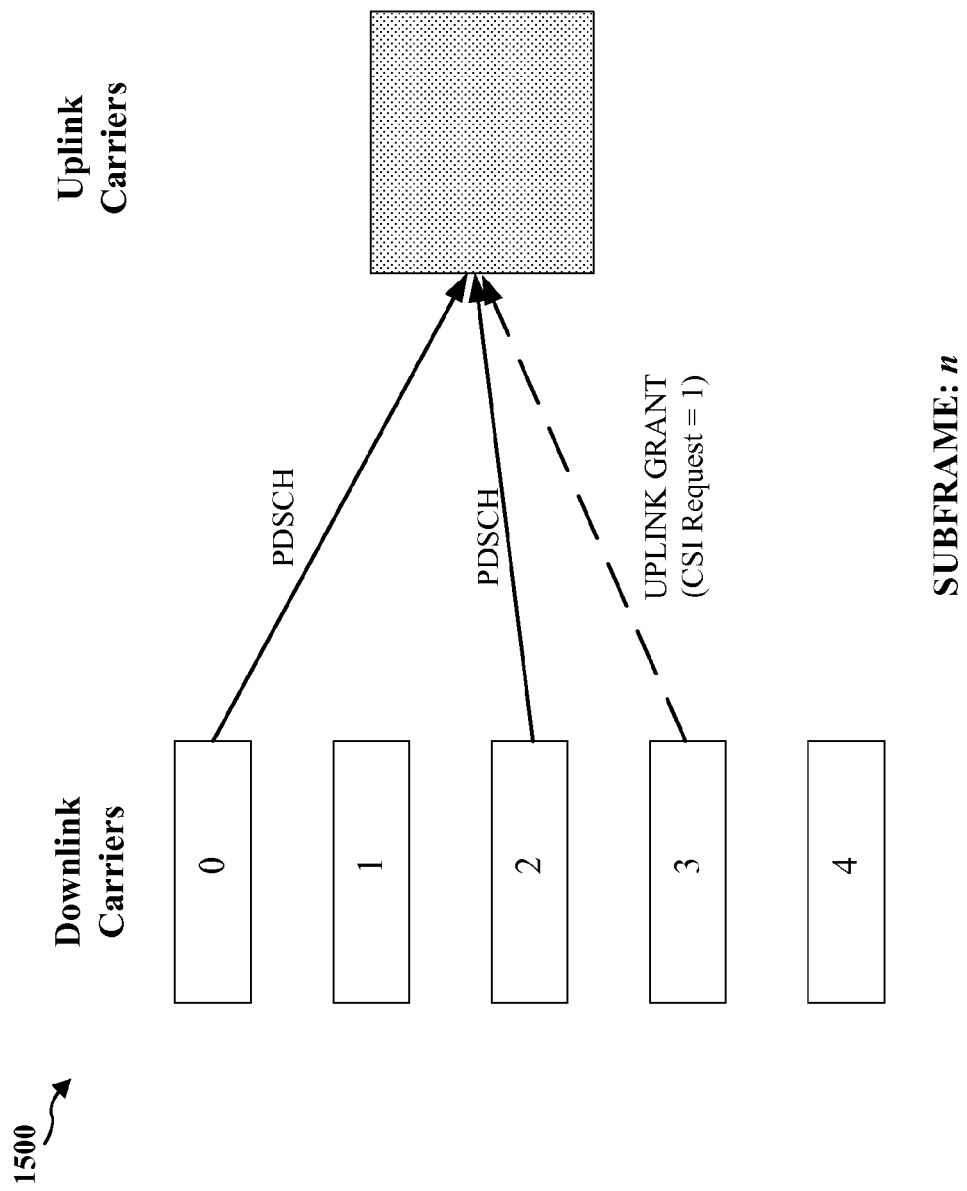
FIG. 15 is a first diagram illustrating a fourth exemplary method for conveying the set of CCs for which the CSI report may be provided.
Figure 16:
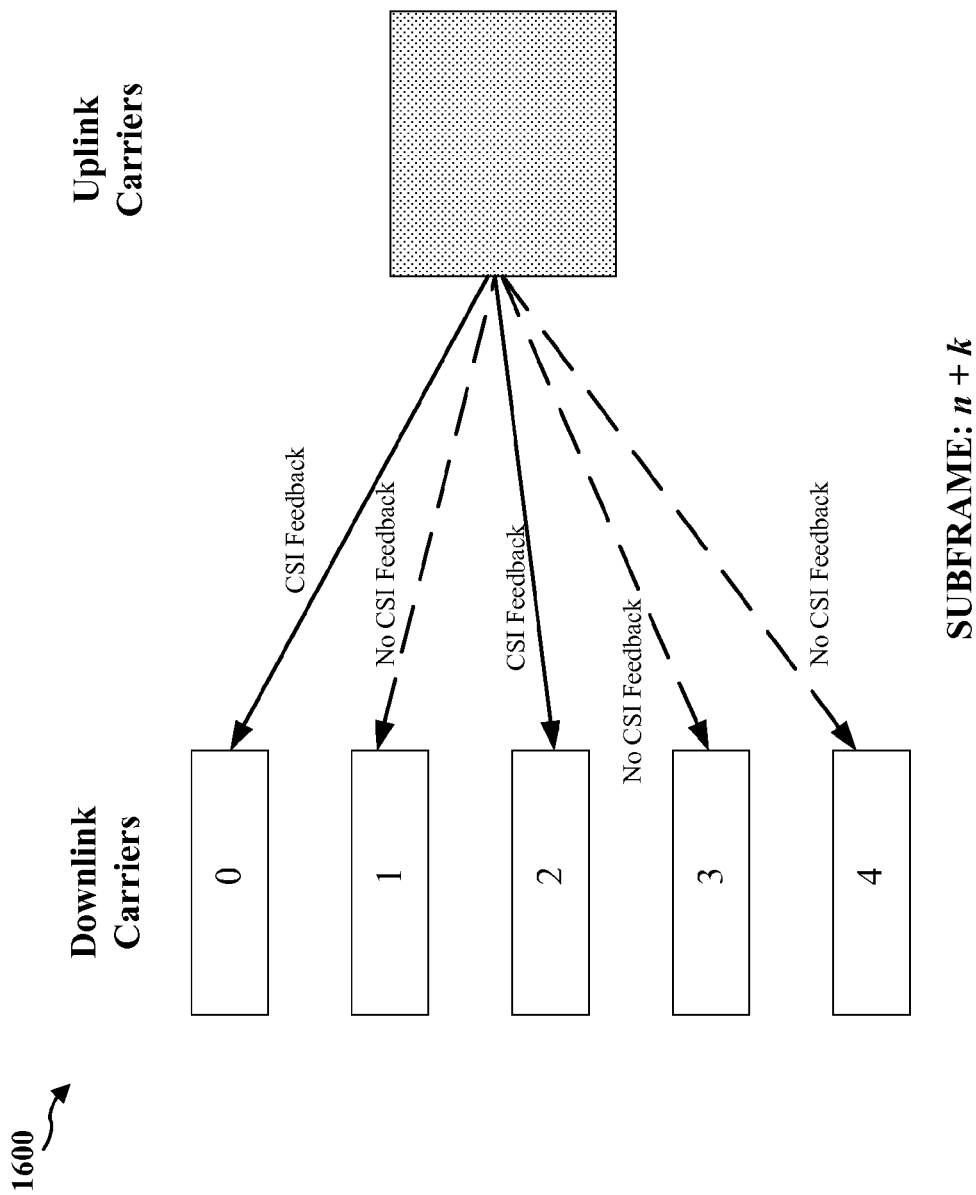
FIG. 16 is a second diagram illustrating the fourth exemplary method for conveying the set of CCs for which the CSI report may be provided.

FIG. 15 is a first diagram 1500 illustrating a fourth exemplary method for conveying the set of CCs for which the CSI report should be provided. FIG. 16 is a second diagram 1600 illustrating the fourth exemplary method for conveying the set of CCs for which the CSI report should be provided. According to the method, when the bit in the CSI request is set to 1 in the UL grant, the UE 804 provides CSI reports in the corresponding PUSCH for the DL CCs that have a PDSCH transmission in the same subframe as the UL grant. As such, if an UL grant with the bit in the CSI request set to 1 is received in subframe k, the UE 804 will provide a CSI report for the CCs on which a PDSCH is received in the subframe k. For example, as shown in FIG. 15 and FIG. 16, if the UL grant with a positive CSI request (i.e., bit set to 1) is received in the PDCCH on CC3 of subframe k and a PDSCH is received on CC0 and CC2 of the same subframe k, the UE 804 will provide a CSI report for the CCs 0, 2 and will not provide a CSI report for the CCs 1, 3, 4.

Alternatively, the UE 804 may determine the set of CCs for which to send the CSI report based on a carrier indicator field (CIF) in a received PDCCH in the same subframe as the received request. In such a configuration, the received PDCCH includes a DL grant for scheduling a PDSCH and the CIF indicates a CC for which the received PDCCH applies. As such, if the UE 804 receives multiple PDCCHs in subframe k and the PDCCHs each include a DL grant for scheduling a PDSCH, the UE 804 determines the set of CCs for which to send the CSI report based on the CIF for indicating a CC for which the received PDCCH applies included in each of the DL grants.

Figure 17:
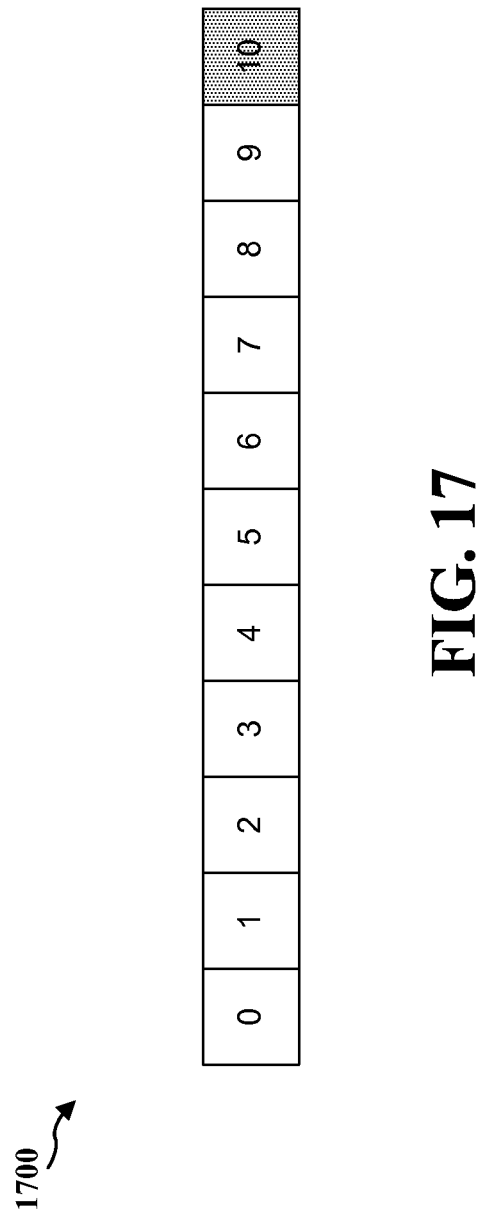
FIG. 17 is a diagram illustrating a fifth exemplary method for conveying the set of CCs for which the CSI report may be provided.

FIG. 17 is a diagram 1700 illustrating a fifth exemplary method for conveying the set of CCs for which the CSI report should be provided. According to the method, in DCI format 0, the resource allocation field may be redefined with some bits in the field denoting the set of DL CCs that request aperiodic CSI reports when the bit in the CSI field is set to 1. In DCI format 0, the resource allocation field has S bits, where S is defined as follows:

$$S = \lceil \log_2(N_{RB}^{UL}(N_{RB}^{UL}+1))/2 \rceil.$$

The S bits can address any single-carrier resource allocation with allocation bandwidth ranging from 1 RB to $N_{RB}^{UL}$ RBs. Some allocation bandwidth is actually not allowed in LTE to maintain a low discrete Fourier transform (DFT) implementation complexity. In LTE, the number of RBs allocated must be a multiple of 2, 3, 5, or 7. In one example, in a 10 MHz system with an allocation bandwidth of 50 RBs, S=11 bits. The 11 bits can identify 1275 hypothesis. Taking into account the scheduling limitation, there are only 738 hypothesis. Only 10 bits are needed to fully address the 738 hypothesis. As such, one bit remains that can be used for conveying the set of CCs for which the CSI report should be provided. For example, as shown in FIG. 17, X bits (e.g., the 10 non-shaded bits) can be used out of S bits (e.g., 11 bits) to address the resource allocation in a smaller set that contains less than $2^X$ hypothesis and more than $2^{X-1}$ hypothesis. The remaining S-X bits (e.g., the 1 shaded bit) can be used to identify the set of DL CCs for aperiodic CSI reports.

Figure 18:
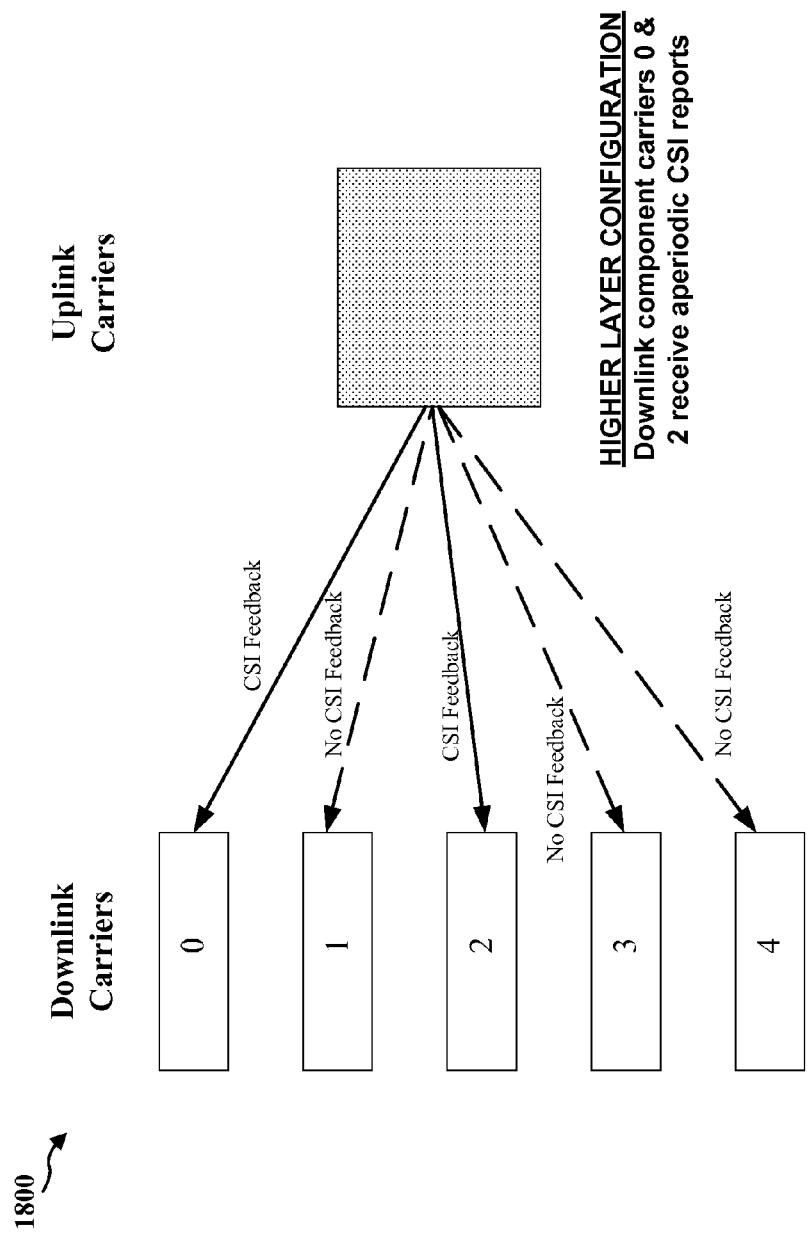
FIG. 18 is a first diagram illustrating a sixth exemplary method for conveying the set of CCs for which the CSI report may be provided.
Figure 19:
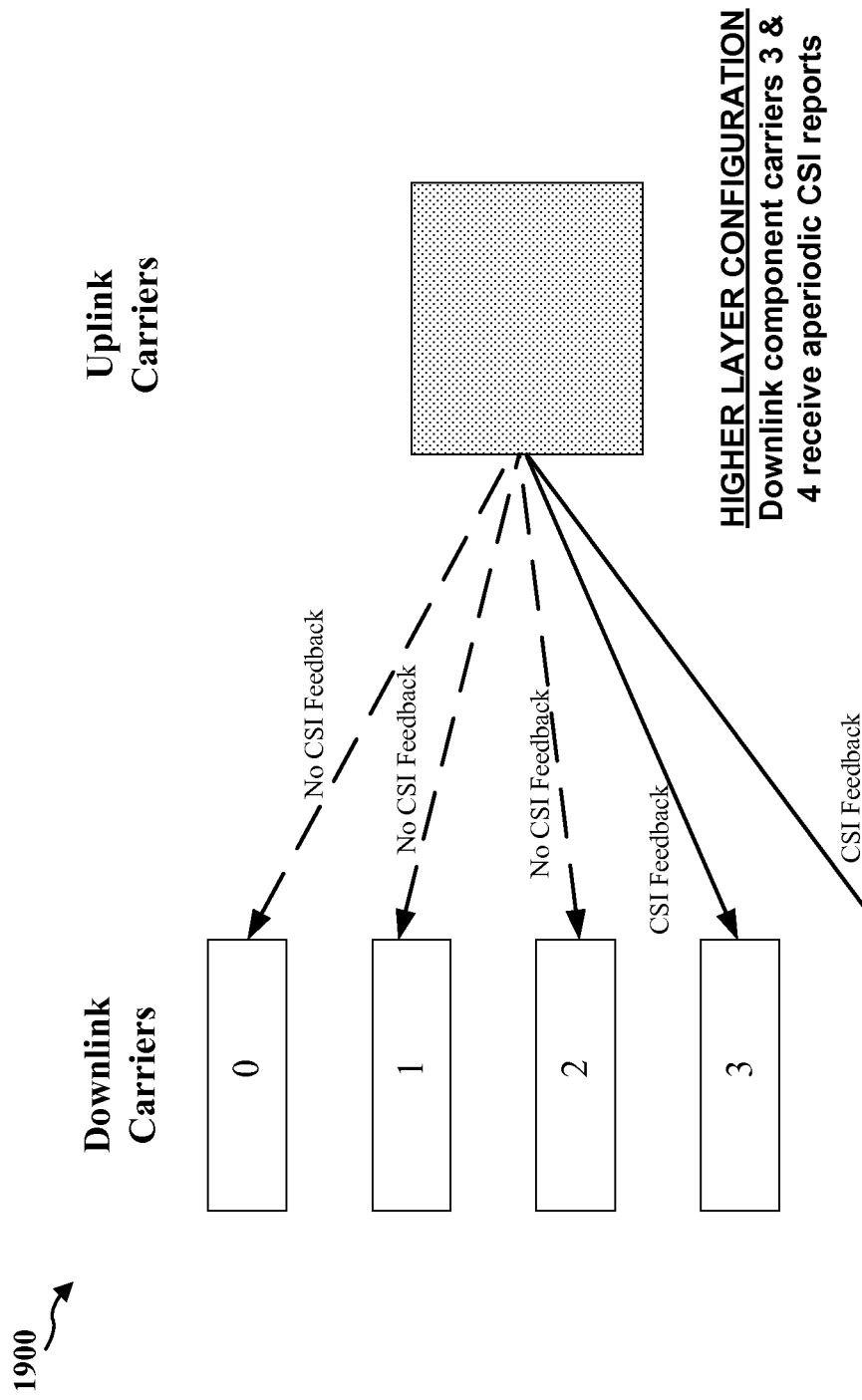
FIG. 19 is a second diagram illustrating the sixth exemplary method for conveying the set of CCs for which the CSI report may be provided.

FIG. 18 is a first diagram 1800 illustrating a sixth exemplary method for conveying the set of CCs for which the CSI report should be provided. FIG. 19 is a second diagram 1900 illustrating the sixth exemplary method for conveying the set of CCs for which the CSI report should be provided. According to the method, if the CSI request field is 1 bit and the bit indicates that a CSI report is triggered (e.g., the bit is set to 1), a CSI report is triggered for a particular or predetermined set of CCs, such as for example, the CC on which the CSI request is received. However, if the CSI request field is 2 bits, then the CSI report may be triggered for any of a plurality of CCs. For example, in one configuration, if the CSI request field is "00," then no aperiodic CSI report is triggered; if the CSI request field is "01," then an aperiodic CSI report is triggered for a defined or predetermined CC; if the CSI request field is "10," then an aperiodic CSI report is triggered for a first set of CCs configured semi-statically through RRC signaling; and if the CSI request field is "11," then an aperiodic CSI report is triggered for a second set of CCs configured semi-statically through RRC signaling. Other configurations are possible.

An example of this method is provided in FIG. 18 and FIG. 19. The eNodeB 802 may configure the first set of CCs to include CC0 and CC2 and the second set of CCs to include CC3 and CC4. In one UL grant, the eNodeB 802 may include 2 bits in the CSI request field and set the 2 bits to "10" to indicate that the UE 804 should provide a CSI report for CCs 0, 2, as shown in FIG. 18, and in another UL grant, the eNodeB 802 may include 2 bits in the CSI request field and set the 2 bits to "11" to indicate that the UE 804 should provide a CSI report for CCs 3, 4, as shown in FIG. 19.

In summary, for this method, for aperiodic CSI reporting using PUSCH, the UE 804 performs aperiodic CQI, PMI, and RI reporting using the PUSCH in subframe n+k on the serving cell of the corresponding PUSCH transmission, upon decoding the CSI request in subframe n either in UL DCI format or a random access response grant on a particular DL serving cell (i.e., a particular CC) and the respective CSI request field is set to trigger a report and is not reserved. If the CSI request field is one bit, a report is triggered if the CSI request field is set to 1. If the CSI request field is set to two bits, a report may be triggered according to the values in the following table:

| Value of CSI request field | Description |
| --- | --- |
| '00' | No aperiodic CSI report is triggered |
| '01' | Aperiodic CSI report triggered for a particular serving cell (i.e., CC) |
| '10' | Aperiodic CSI report is triggered for a $1^{st}$ set of serving cells (i.e., CCs) configured by higher layers |
| '11' | Aperiodic CSI report is triggered for a $2^{nd}$ set of serving cells (i.e., CCs) configured by higher layers |

As discussed supra, the table of values is but one example, and different configurations are possible.

Figure 20:
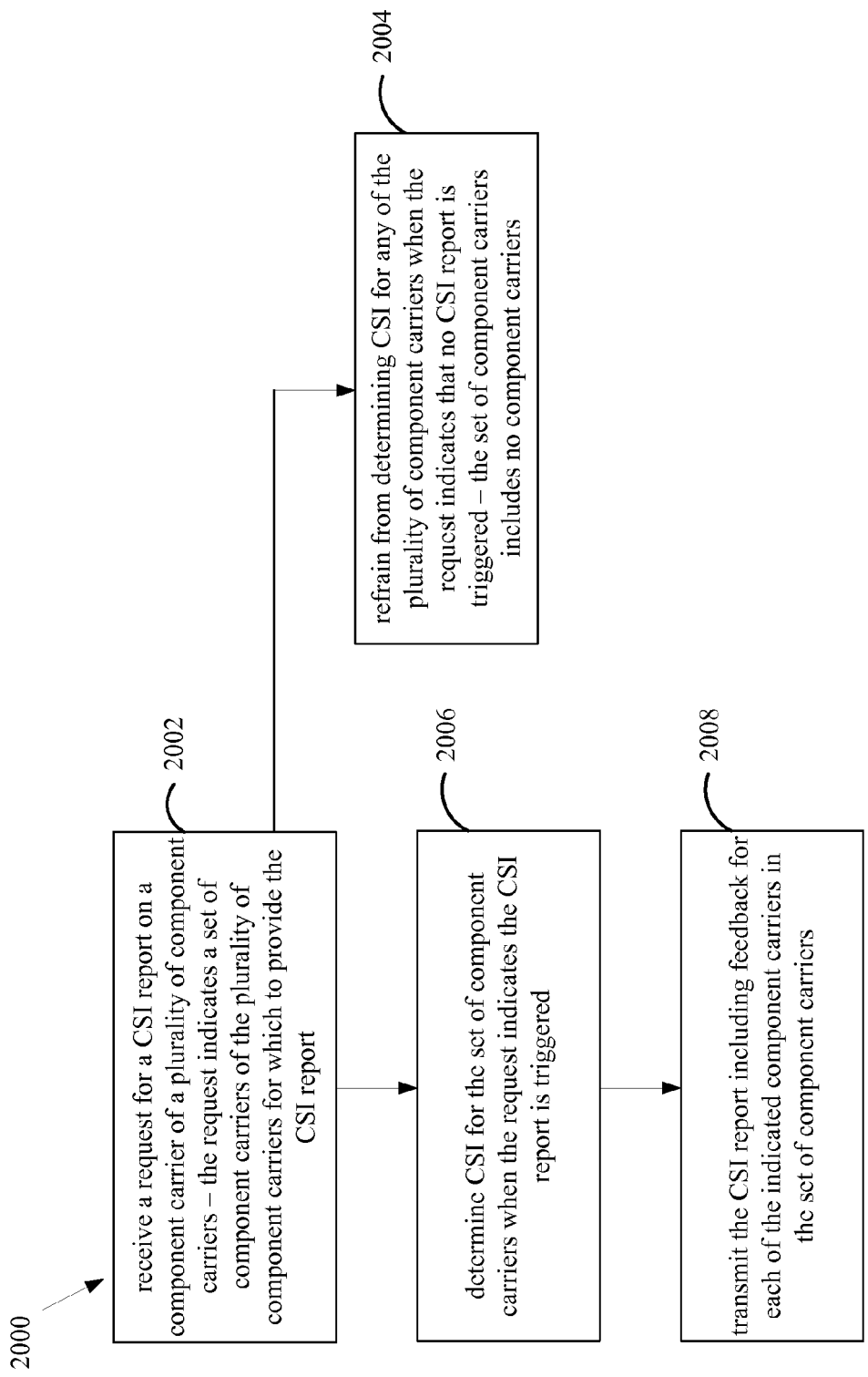
FIG. 20 is a flow chart of a method of wireless communication of a user equipment.

FIG. 20 is a flow chart 2000 of a method of wireless communication of a UE. The method may be performed by a UE, such as the UE 804. According to the method, the UE 804 receives a request for a CSI report on a CC of a plurality of CCs (at step 2002). The request indicates a set of CCs of the plurality of CC2 for which to provide the CSI report. The UE 804 refrains from determining CSI for any of the plurality of CCs when the request indicates that no CSI report is triggered (at step 2004). When the request indicates that no CSI report is triggered, the set of CCs includes no CCs. The UE 804 determines CSI for the set of CCs when the request indicates the CSI report is triggered (at step 2006). The UE 804 transmits the CSI report that includes the determined CSI for each of the indicated CCs in the set of CCs (at step 2008). In one configuration, the set of CCs includes said CC only when the request includes one bit only for indicating the set of CCs and the one bit indicates that the CSI report is triggered. In one configuration, the set of CCs includes a predetermined CC when the request includes two bits for indicating the set of CCs and the two bits indicate that a CSI report is triggered for the predetermined CC. In one configuration, the set of CCs includes the CCs in a first set of CCs or a second set of CCs configured semi-statically through RRC signaling when the request includes two bits for indicating the set of CCs and the two bits indicate that a CSI report is triggered for the first set of CCs or the second set of CCs. In another configuration, the request may include five bits for indicating any subset of five CCs for which to provide the feedback. More generally, the request may include n bits for indicating any subset of n CCs for which to provide the feedback.

Figure 21:
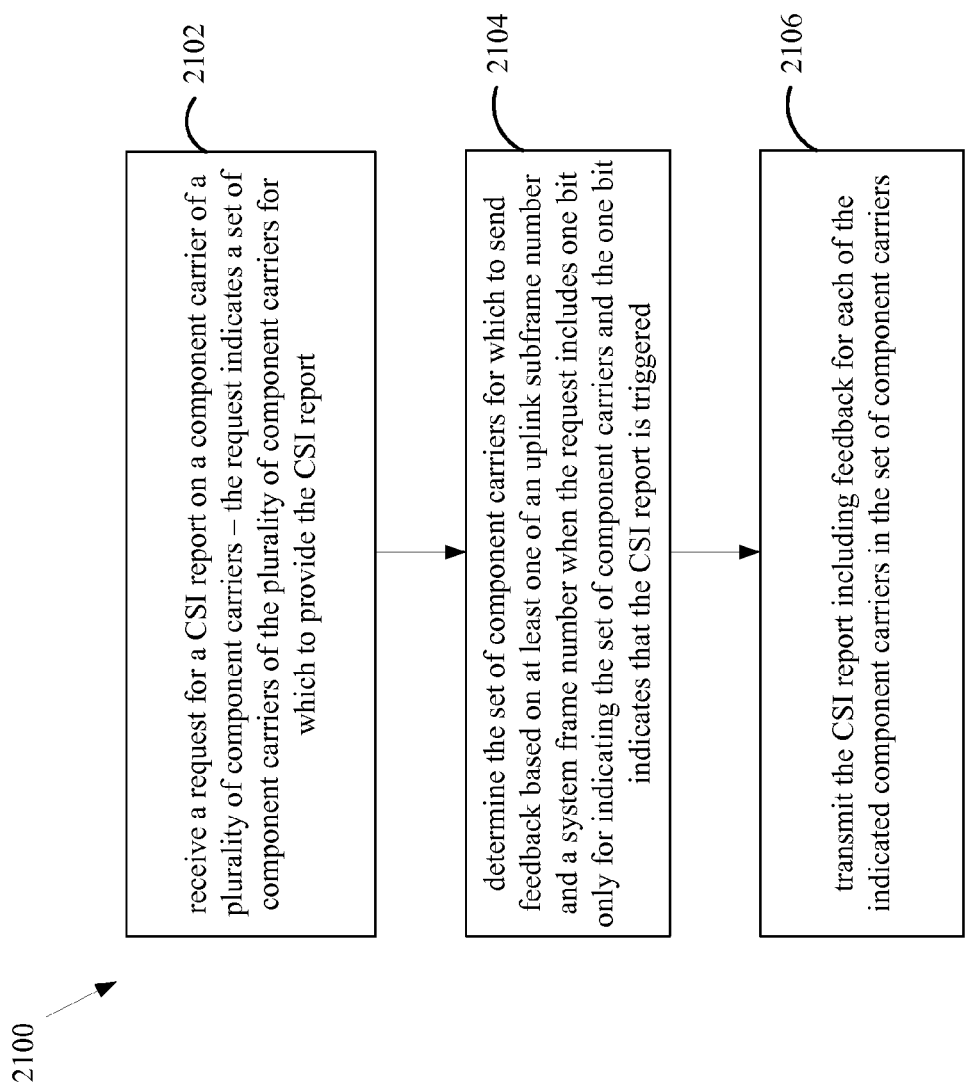
FIG. 21 is a flow chart of a second method of wireless communication of a user equipment.

FIG. 21 is a flow chart 2100 of a second method of wireless communication of a UE. The method may be performed by a UE, such as the UE 804. According to the method, the UE 804 receives a request for a CSI report on a CC of a plurality of CCs (at step 2102). The request indicates a set of CCs of the plurality of CC2 for which to provide the CSI report. The UE 804 determines the set of CCs for which to send feedback based on at least one of an UL subframe number and a SFN when the request includes one bit only for indicating the set of CCs and the one bit indicates that the CSI report is triggered (at step 2104). The UE 804 transmits the CSI report that includes the determined CSI for each of the indicated CCs in the set of CCs (at step 2106).

Figure 22:
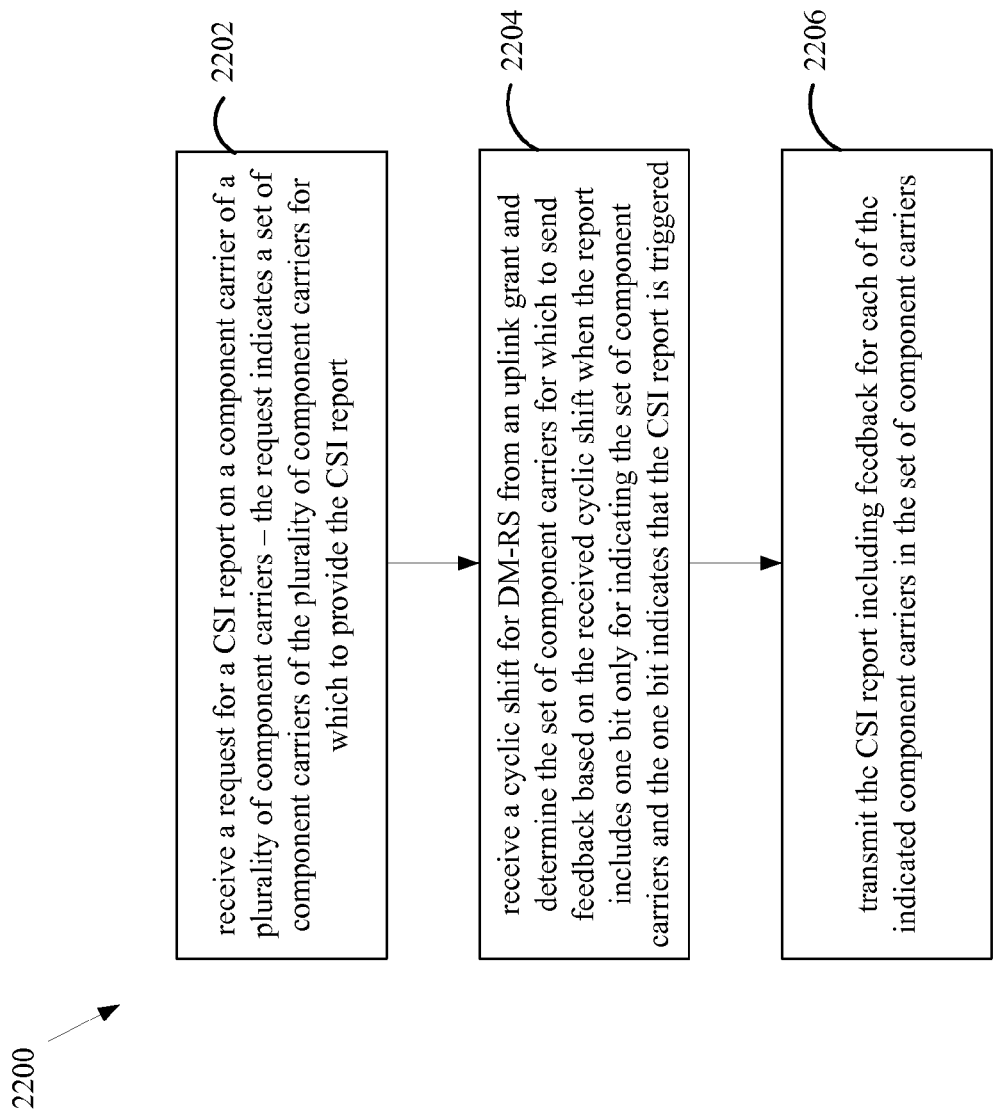
FIG. 22 is a flow chart of a third method of wireless communication of a user equipment.

FIG. 22 is a flow chart 2200 of a third method of wireless communication of a UE. The method may be performed by a UE, such as the UE 804. According to the method, the UE 804 receives a request for a CSI report on a CC of a plurality of CCs (at step 2202). The request indicates a set of CCs of the plurality of CC2 for which to provide the CSI report. The UE 804 receives a cyclic shift for DM-RS from an UL grant and determines the set of CCs for which to send feedback based on the received cyclic shift when the report includes one bit only for indicating the set of CCs and the one bit indicates that the CSI report is triggered (at step 2204). The UE 804 transmits the CSI report that includes the determined CSI for each of the indicated CCs in the set of CCs (at step 2206). In one configuration, the set of CCs for which to send feedback is further determined based on a received reserved MCS index.

Figure 23:
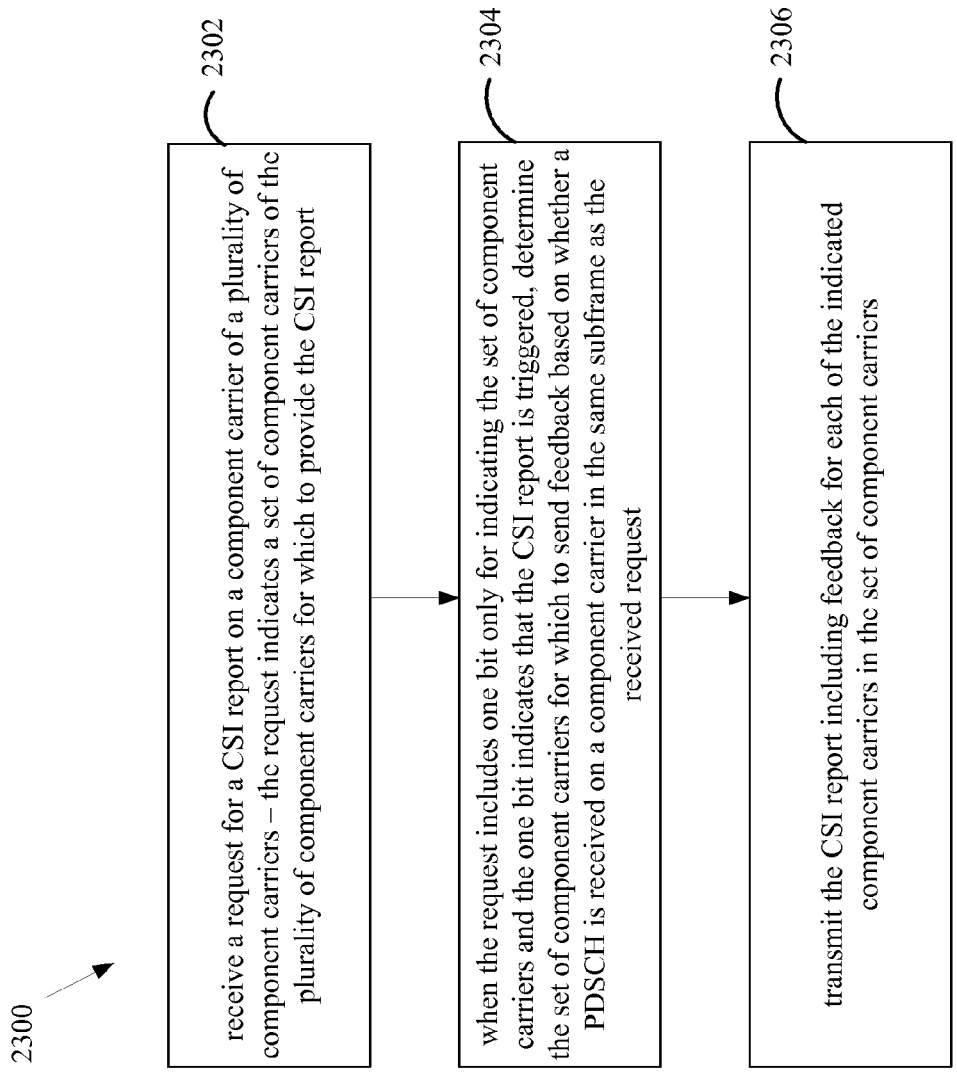
FIG. 23 is a flow chart of a fourth method of wireless communication of a user equipment.

FIG. 23 is a flow chart 2300 of a fourth method of wireless communication of a UE. The method may be performed by a UE, such as the UE 804. According to the method, the UE 804 receives a request for a CSI report on a CC of a plurality of CCs (at step 2302). The request indicates a set of CCs of the plurality of CC2 for which to provide the CSI report. When the request includes one bit only for indicating the set of CCs and the one bit indicates that the CSI report is triggered, the UE 804 determines the set of CCs for which to send feedback based on whether a PDSCH is received on a CC in the same subframe as the received request (at step 2304). The UE 804 transmits the CSI report that includes the determined CSI for each of the indicated CCs in the set of CCs (at step 2306).

Figure 24:
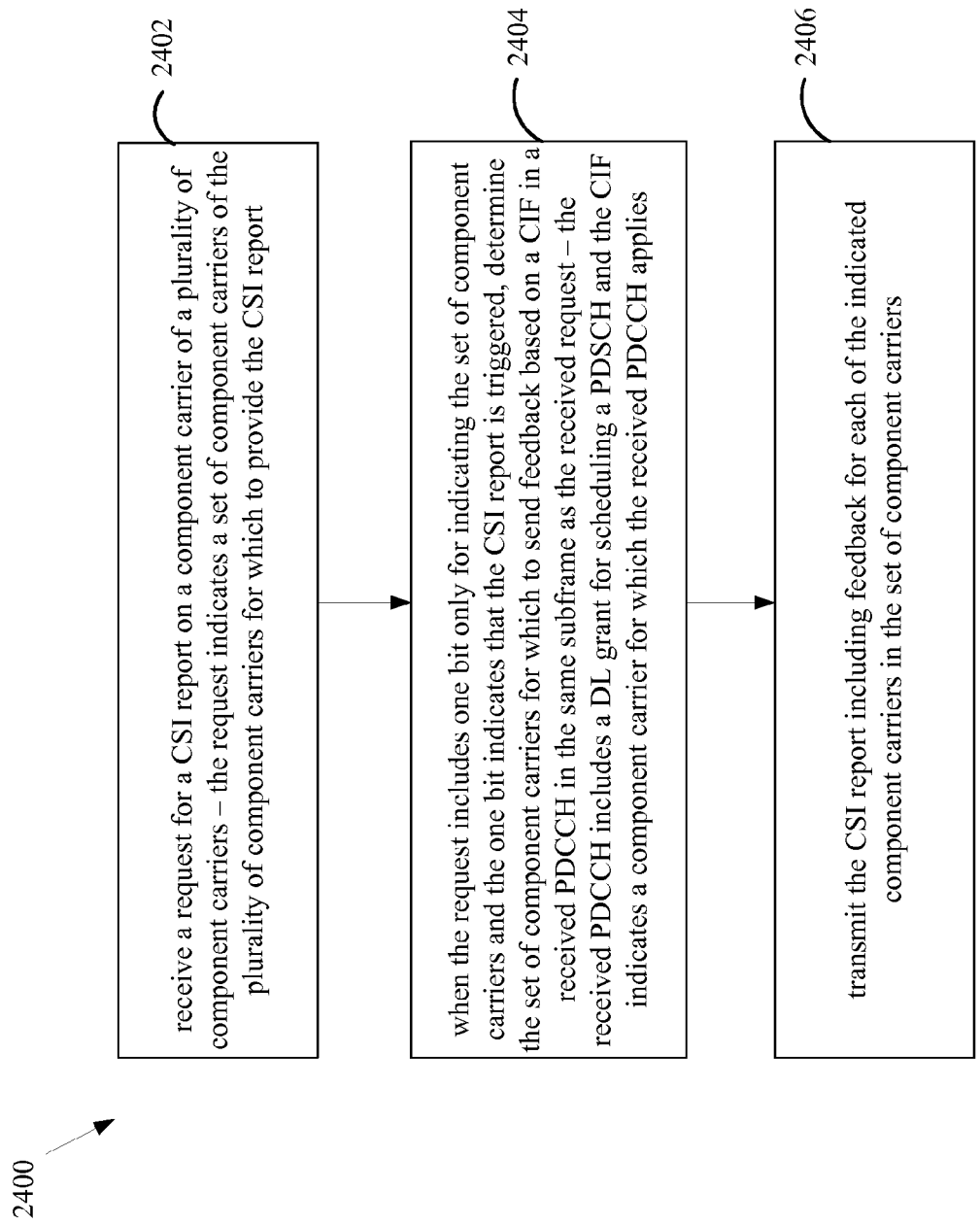
FIG. 24 is a flow chart of a fifth method of wireless communication of a user equipment.

FIG. 24 is a flow chart 2400 of a fifth method of wireless communication of a UE. The method may be performed by a UE, such as the UE 804. According to the method, the UE 804 receives a request for a CSI report on a CC of a plurality of CCs (at step 2402). The request indicates a set of CCs of the plurality of CC2 for which to provide the CSI report. When the request includes one bit only for indicating the set of CCs and the one bit indicates that the CSI report is triggered, the UE 804 determines the set of CCs for which to send feedback based on a CIF in a received PDCCH in the same subframe as the received request (at step 2404). The received PDCCH includes a DL grant for scheduling a PDSCH and the CIF indicates a CC for which the received PDCCH applies. The UE 804 transmits the CSI report that includes the determined CSI for each of the indicated CCs in the set of CCs (at step 2406).

Figure 25:
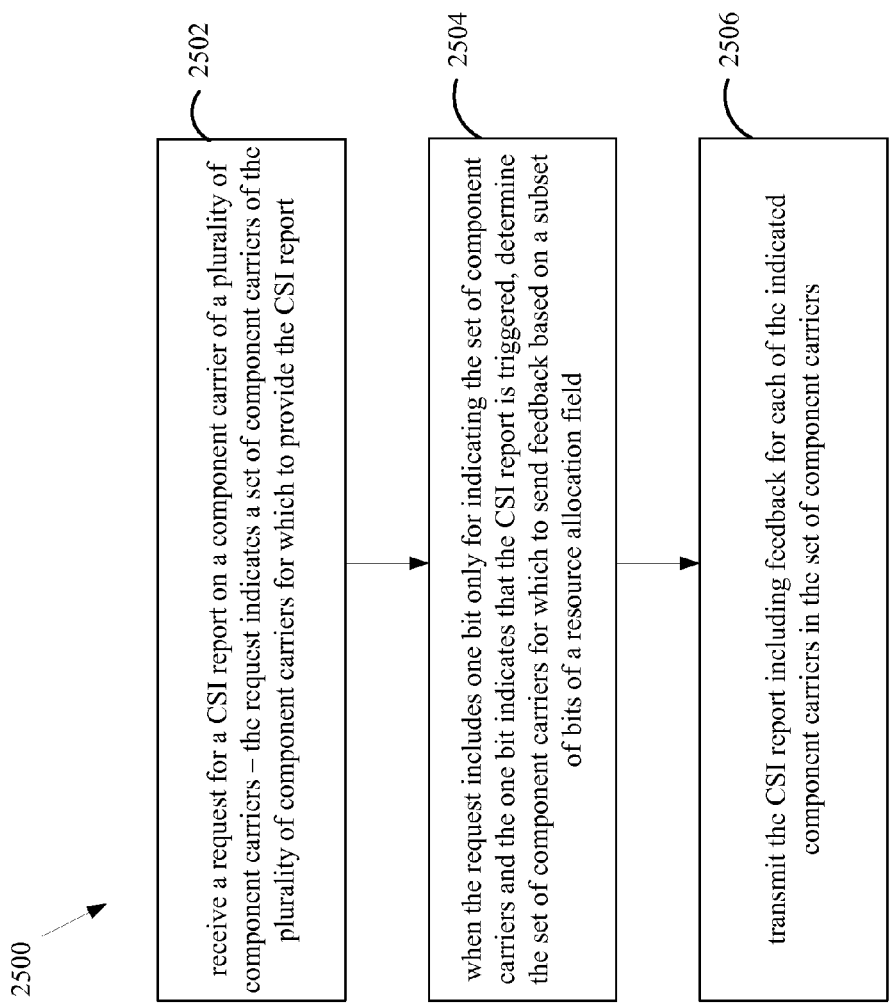
FIG. 25 is a flow chart of a sixth method of wireless communication of a user equipment.

FIG. 25 is a flow chart 2500 of a sixth method of wireless communication of a UE. The method may be performed by a UE, such as the UE 804. According to the method, the UE 804 receives a request for a CSI report on a CC of a plurality of CCs (at step 2502). The request indicates a set of CCs of the plurality of CC2 for which to provide the CSI report. When the request includes one bit only for indicating the set of CCs and the one bit indicates that the CSI report is triggered, the UE 804 determines the set of CCs for which to send feedback based on a subset of bits of a resource allocation field (at step 2504). The UE 804 transmits the CSI report that includes the determined CSI for each of the indicated CCs in the set of CCs (at step 2506).

Figure 26:
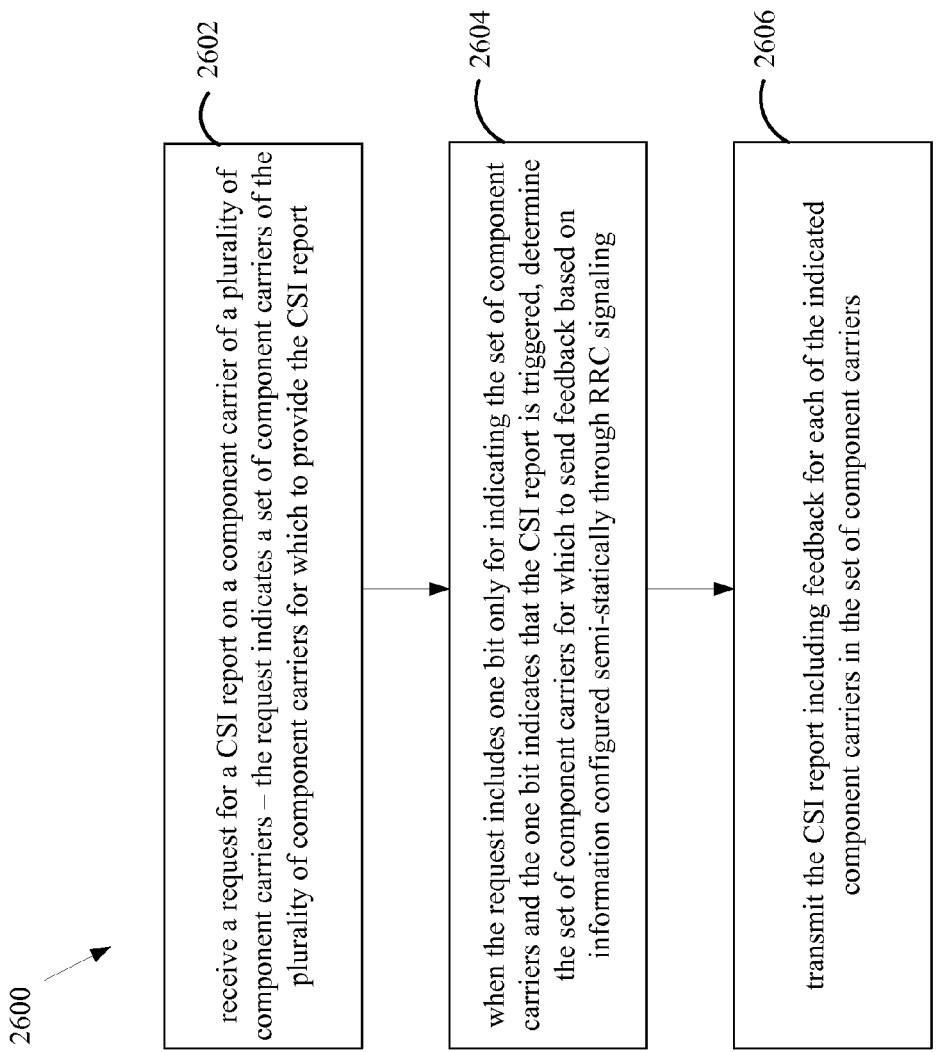
FIG. 26 is a flow chart of a seventh method of wireless communication of a user equipment.

FIG. 26 is a flow chart 2600 of a seventh method of wireless communication of a UE. The method may be performed by a UE, such as the UE 804. According to the method, the UE 804 receives a request for a CSI report on a CC of a plurality of CCs (at step 2602). The request indicates a set of CCs of the plurality of CC2 for which to provide the CSI report. When the request includes one bit only for indicating the set of CCs and the one bit indicates that the CSI report is triggered, the UE 804 determines the set of CCs for which to send feedback based on information configured semi-statically through RRC signaling (at step 2604). The UE 804 transmits the CSI report that includes the determined CSI for each of the indicated CCs in the set of CCs (at step 2606).

Figure 27:
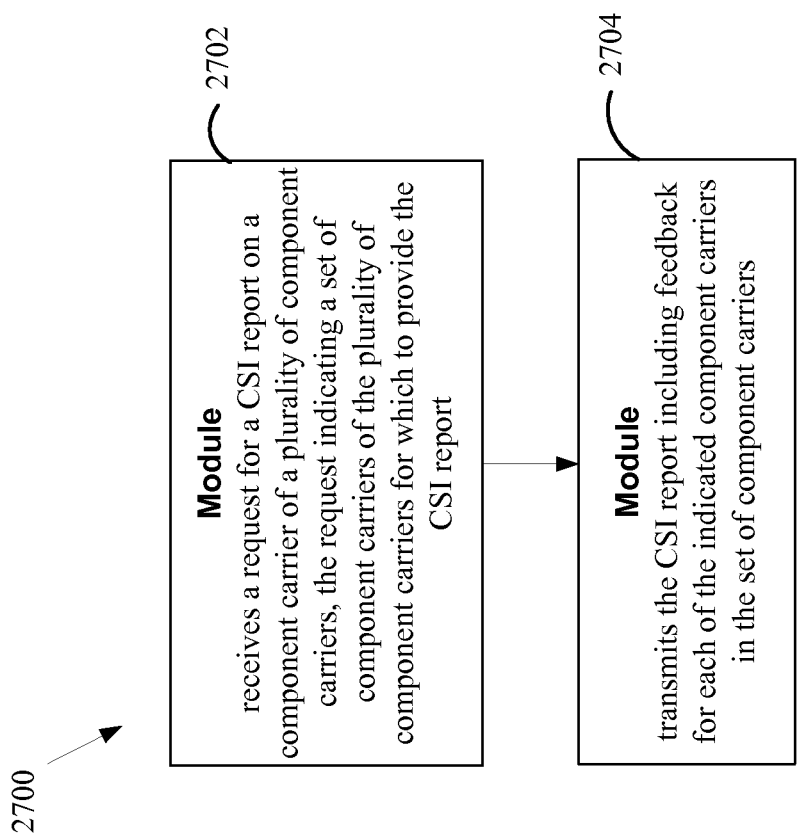
FIG. 27 is a conceptual block diagram illustrating the functionality of an exemplary user equipment apparatus.

FIG. 27 is a diagram 2700 illustrating the functionality of an exemplary UE apparatus 100. The apparatus 100 may be the UE 804. The apparatus 100 includes a module 2702 that receives a request for a CSI report on a CC of a plurality of CCs. The request indicates a set of CCs of the plurality of CCs for which to provide the CSI report. The apparatus 100 further includes a module 2704 that transmits the CSI report including feedback for each of the indicated CCs in the set of CCs. The apparatus 100 may include additional modules that perform each of the steps in the aforementioned flow charts of FIGS. 20-26. As such, each step in the aforementioned flow charts of FIGS. 20-26 may be performed by a module and the apparatus 100 may include one or more of those modules.

Figure 28:
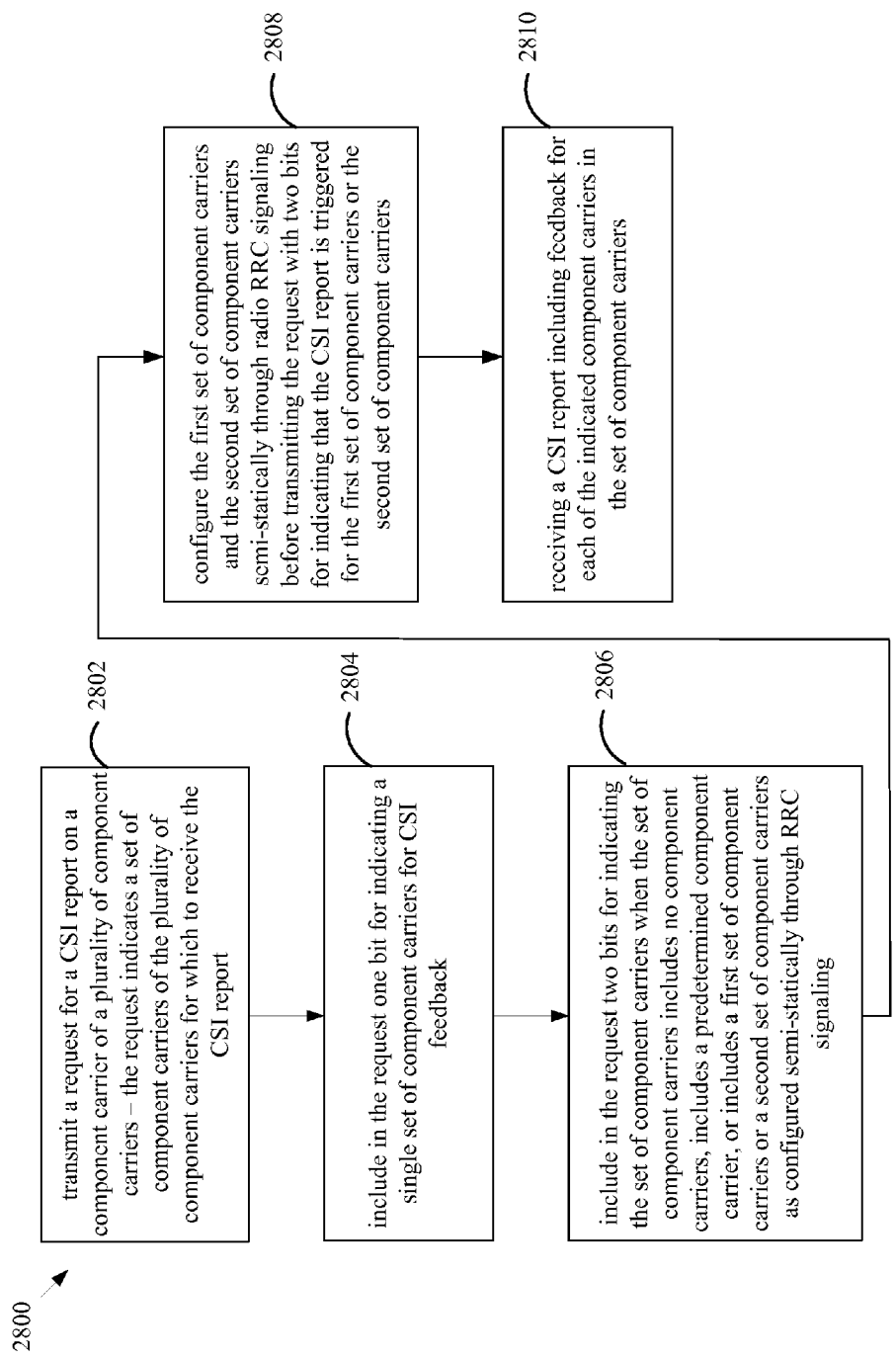
FIG. 28 is a flow chart of a method of wireless communication of an evolved Node B.

FIG. 28 is a flow chart 2800 of a method of wireless communication of an eNodeB. The method may be performed by an eNodeB, such as the eNodeB 802. The eNodeB 802 transmits a request for a CSI report on a CC of a plurality of CCs (at step 2802). The request indicates a set of CCs of the plurality of CCs for which to receive the CSI report. The eNodeB 802 may include in the request one bit for indicating the single set of CCs for CSI feedback (at step 2804). The eNodeB 802 may include in the request two bits for indicating the set of CCs when the set of CCs includes no CCs, includes a predetermined CC, or includes a first set of CCs or a second set of CCs as configured semi-statically through RRC signaling (at step 2806). The eNodeB 802 may configure the first set of CCs and the second set of CCs semi-statically through RRC signaling before transmitting the request with two bits for indicating that the CSI report is triggered for the first set of CCs or the second set of CCs (at step 2808). The eNodeB 802 receives a CSI report including feedback for each of the indicated CCs in the set of CCs (at step 2810).

Figure 29:
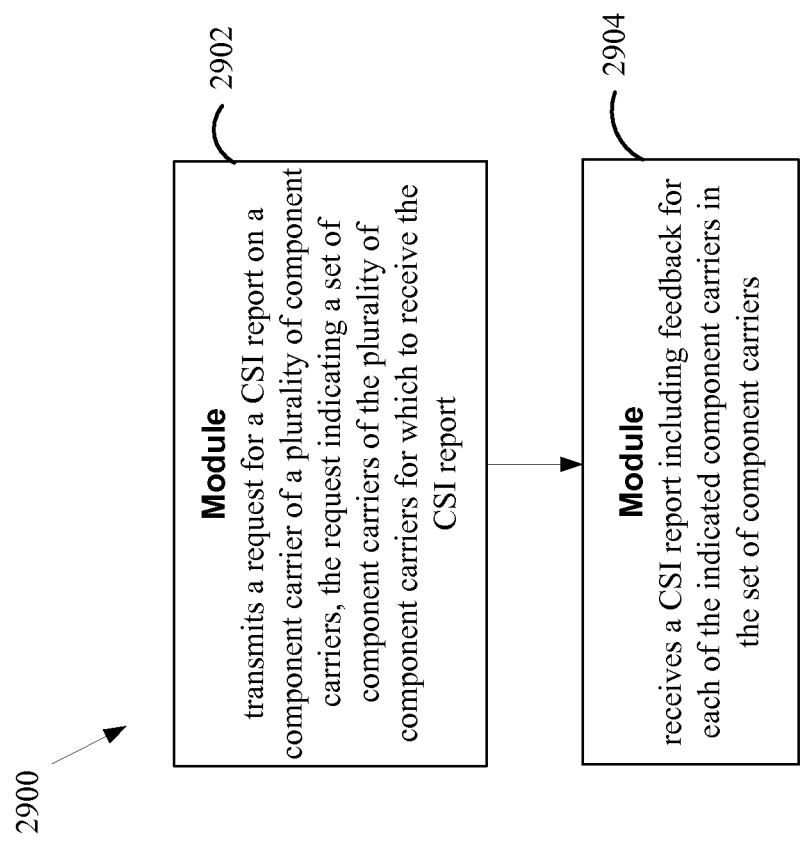
FIG. 29 is a conceptual block diagram illustrating the functionality of an exemplary evolved Node B apparatus.

FIG. 29 is a diagram 2900 illustrating the functionality of an exemplary eNodeB apparatus 100. The apparatus 100 may be the eNodeB 802. The apparatus 100 includes a module 2902 that transmits a request for a CSI report on a CC of a plurality of CCs. The request indicates a set of CCs of the plurality of CCs for which to receive the CSI report. The apparatus 100 further includes a module 2904 that receives a CSI report including feedback for each of the indicated CCs in the set of CCs. The apparatus 100 may include additional modules that perform each of the steps in the aforementioned flow chart of FIG. 28. As such, each step in the aforementioned flow chart of FIG. 28 may be performed by a module and the apparatus 100 may include one or more of those modules.

Referring to FIG. 1 and FIG. 7, in one configuration, the apparatus 100 for wireless communication includes means for transmitting a request for a CSI report on a CC of a plurality of CCs. The request indicates a set of CCs of the plurality of CCs for which to receive the CSI report. The apparatus 100 further includes means for receiving a CSI report including feedback for each of the indicated CCs in the set of CCs. The apparatus 100 may further include means for including in the request one bit only for indicating the set of CCs when the set of CCs includes only the CC. The apparatus 100 may further include means for including in the request two bits for indicating the set of CCs when the set of CCs includes no CCs, includes a predetermined CC, or includes a first set of CCs or a second set of CCs as configured semi-statically through RRC signaling. The apparatus 100 may further include means for configuring the first set of CCs and the second set of CCs semi-statically through RRC signaling before transmitting the request with two bits for indicating that the CSI report is triggered for the first set of CCs or the second set of CCs. The aforementioned means is the processing system 114 configured to perform the functions recited by the aforementioned means. As described supra, the processing system 114 includes the TX Processor 716, the RX Processor 770, and the controller/processor 775. As such, in one configuration, the aforementioned means may be the TX Processor 716, the RX Processor 770, and the controller/processor 775 configured to perform the functions recited by the aforementioned means.

In one configuration, the apparatus 100 for wireless communication includes means for receiving a request for a CSI report on a CC of a plurality of CCs. The request indicates a set of CCs of the plurality of CCs for which to provide the CSI report. The apparatus 100 further includes means for transmitting the CSI report including feedback for each of the indicated CCs in the set of CCs. The apparatus 100 may further include means for refraining from determining CSI for any of the plurality of CCs when the request indicates that no CSI report is triggered. In such a configuration, the set of CCs includes no CCs. The apparatus 100 may further include means for determining CSI for the set of CCs when the request indicates the CSI report is triggered. In such a configuration, the CSI report includes the determined CSI. The apparatus 100 may further include means for determining the set of CCs for which to send feedback based on at least one of an UL subframe number and a system frame number when the request includes one bit only for indicating the set of CCs and the one bit indicates that the CSI report is triggered. The apparatus 100 may further include means for receiving a cyclic shift for DM-RS from an UL grant, and means for determining the set of CCs for which to send feedback based on the received cyclic shift when the report includes one bit only for indicating the set of CCs and the one bit indicates that the CSI report is triggered. When the request includes one bit only for indicating the set of CCs and the one bit indicates that the CSI report is triggered, the apparatus 100 may further include means for determining the set of CCs for which to send feedback based on whether a PDSCH is received on a CC in the same subframe as the received request. When the request includes one bit only for indicating the set of CCs and the one bit indicates that the CSI report is triggered, the apparatus 100 may further include means for determining the set of CCs for which to send feedback based on a CIF in a received PDCCH in the same subframe as the received request. In such a configuration, the received PDCCH includes a DL grant for scheduling a PDSCH and the CIF indicates a CC for which the received PDCCH applies. When the request includes one bit only for indicating the set of CCs and the one bit indicates that the CSI report is triggered, the apparatus 100 may further include means for determining the set of CCs for which to send feedback based on a subset of bits of a resource allocation field. When the request includes one bit only for indicating the set of CCs and the one bit indicates that the CSI report is triggered, the apparatus 100 may further include means for determining the set of CCs for which to send feedback based on information configured semi-statically through RRC signaling. The aforementioned means is the processing system 114 configured to perform the functions recited by the aforementioned means. As described supra, the processing system 114 includes the TX Processor 768, the RX Processor 756, and the controller/processor 759. As such, in one configuration, the aforementioned means may be the TX Processor 768, the RX Processor 756, and the controller/processor 759 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of wireless communication, comprising:
    receiving a request for a channel state information (CSI) report for at least one component carrier of a plurality of component carriers;
    determining a set of component carriers based at least in part on the request when the request comprises a plurality of bits; and
    transmitting the CSI report including feedback for each component carrier in the determined set of component carriers.

2. The method of claim 1, further comprising refraining from determining CSI for any of the plurality of component carriers when the request indicates that no CSI report is triggered, wherein the determined set of component carriers includes no component carriers.

3. The method of claim 1, further comprising determining CSI for the determined set of component carriers when the request indicates the CSI report is triggered, wherein the CSI report includes the determined CSI.

4. The method of claim 1, wherein the determined set of component carriers only includes a specific component carrier when the request includes one bit.

5. The method of claim 1, wherein the determined set of component carriers includes a predetermined component carrier when the request includes two bits.

6. The method of claim 1, wherein the determined set of component carriers includes the component carriers in a first set of component carriers or a second set of component carriers configured semi-statically through radio resource control (RRC) signaling when the request includes two bits and the two bits indicate that the CSI report is triggered for the first set of component carriers or the second set of component carriers.

7. The method of claim 1, wherein the request includes five bits for indicating any subset of five component carriers for which to provide the feedback.

8. The method of claim 1, further comprising determining the set of component carriers for which to send feedback based on one or more of an uplink subframe number, a system frame number, or a combination thereof when the request includes one bit.

9. The method of claim 1, further comprising: receiving a cyclic shift for demodulation reference signals (DM-RS) from an uplink grant; and determining the set of component carriers for which to send feedback based on the received cyclic shift when the report includes one bit.

10. The method of claim 9, wherein the set of component carriers for which to send feedback is further determined based on a received reserved modulation and coding scheme (MCS) index.

11. The method of claim 1, further comprising determining the set of component carriers for which to send feedback based on whether a physical downlink shared channel (PDSCH) is received on a component carrier in the same subframe as the received request when the request includes one bit.

12. The method of claim 1, further comprising determining the set of component carriers for which to send feedback based on a carrier indicator field (CIF) in a received physical downlink control channel (PDCCH) in the same subframe as the received request when the request includes one bit, wherein the received PDCCH includes a downlink grant for scheduling a physical downlink shared channel (PDSCH) and the CIF indicates a component carrier for which the received PDCCH applies.

13. The method of claim 1, further comprising determining the set of component carriers for which to send feedback based on a subset of bits of a resource allocation field when the request includes one bit.

14. The method of claim 1, further comprising determining the set of component carriers for which to send feedback based on information configured semi-statically through radio resource control (RRC) signaling when the request includes one bit.

15. A method of wireless communication, comprising:
transmitting a request for a channel state information (CSI) report for a set of component carriers of a plurality of component carriers; and
receiving the CSI report including feedback for each component carrier in the set of component carriers when the request comprises a plurality of bits for indicating the set of component carriers.

16. The method of claim 15, wherein in the request includes one bit for indicating one component carrier of the plurality of component carriers.

17. The method of claim 15, wherein the plurality of bits indicate no component carriers, a predetermined component carrier, or a first set of component carriers or a second set of component carriers configured semi-statically through radio resource control (RRC) signaling.

18. The method of claim 17, further comprising configuring the first set of component carriers and the second set of component carriers semi-statically through radio resource control (RRC) signaling before transmitting the request with the plurality of bits.

19. An apparatus for wireless communication, comprising:
means for receiving a request for a channel state information (CSI) report for at least one component carrier of a plurality of component carriers;
means for determining a set of component carriers based at least in part on the request when the request comprises a plurality of bits; and
means for transmitting the CSI report including feedback for each component carrier in the determined set of component carriers.

20. The apparatus of claim 19, further comprising means for refraining from determining CSI for any of the plurality of component carriers when the request indicates that no CSI report is triggered, wherein the determined set of component carriers includes no component carriers.

21. The apparatus of claim 19, further comprising means for determining CSI for the determined set of component carriers when the request indicates the CSI report is triggered, wherein the CSI report includes the determined CSI.

22. The apparatus of claim 19, wherein the determined set of component carriers only includes a specific component carrier when the request includes one bit.

23. The apparatus of claim 19, wherein the determined set of component carriers includes a predetermined component carrier when the request includes two bits.

24. The apparatus of claim 19, wherein the determined set of component carriers includes the component carriers in a first set of component carriers or a second set of component carriers configured semi-statically through radio resource control (RRC) signaling when the request includes two bits and the two bits indicate that the CSI report is triggered for the first set of component carriers or the second set of component carriers.

25. The apparatus of claim 19, wherein the request includes five bits for indicating any subset of five component carriers for which to provide the feedback.

26. The apparatus of claim 19, further comprising means for determining the set of component carriers for which to send feedback based on one or more of an uplink subframe number, a system frame number, or a combination thereof when the request includes one bit.

27. The apparatus of claim 19, further comprising: means for receiving a cyclic shift for demodulation reference signals (DM-RS) from an uplink grant; and means for determining the set of component carriers for which to send feedback based on the received cyclic shift when the report includes one bit.

28. The apparatus of claim 27, wherein the means for determining the set of component carriers for which to send feedback further comprises means for determining the set of component carriers based at least in part on a received reserved modulation and coding scheme (MCS) index.

29. The apparatus of claim 19, further comprising means for determining the set of component carriers for which to send feedback based on whether a physical downlink shared channel (PDSCH) is received on a component carrier in the same subframe as the received request when the request includes one bit.

30. The apparatus of claim 19, further comprising means for determining the set of component carriers for which to send feedback based on a carrier indicator field (CIF) in a received physical downlink control channel (PDCCH) in the same subframe as the received request, wherein the received PDCCH includes a downlink grant for scheduling a physical downlink shared channel (PDSCH) and the CIF indicates a component carrier for which the received PDCCH applies when the request includes one bit.

31. The apparatus of claim 19, further comprising means for determining the set of component carriers for which to send feedback based on a subset of bits of a resource allocation field when the request includes one bit.

32. The apparatus of claim 19, further comprising means for determining the set of component carriers for which to send feedback based on information configured semi-statically through radio resource control (RRC) signaling when the request includes one bit.

33. An apparatus for wireless communication, comprising:
means for transmitting a request for a channel state information (CSI) report for a set of component carriers of a plurality of component carriers; and
means for receiving the CSI report including feedback for each component carrier in the set of component carriers when the request comprises a plurality of bits for indicating the set of component carriers.

34. The apparatus of claim 33, wherein the request includes one bit for indicating one component carrier of the plurality of component carriers.

35. The apparatus of claim 33, wherein the plurality of bits indicate no component carriers, a predetermined component carrier, or a first set of component carriers or a second set of component carriers configured semi-statically through radio resource control (RRC) signaling.

36. The apparatus of claim 35, further comprising means for configuring the first set of component carriers and the second set of component carriers semi-statically through radio resource control (RRC) signaling before transmitting the request with the plurality of bits.

37. An apparatus for wireless communication, comprising:
at least one processor configured to:
receive a request for a channel state information (CSI) report for at least one component carrier of a plurality of component carriers;

determine a set of component carriers based at least in part on the request when the request comprises a plurality of bits; and transmit the CSI report including feedback for each of the indicated component carrier in the determined set of component carriers.

38. The apparatus of claim 37, wherein the at least one processor is further configured to refrain from determining CSI for any of the plurality of component carriers when the request indicates that no CSI report is triggered, wherein the determined set of component carriers includes no component carriers.

39. The apparatus of claim 37, wherein the at least one processor is further configured to determine CSI for the set of component carriers when the request indicates the CSI report is triggered, wherein the CSI report includes the determined CSI.

40. The apparatus of claim 37, wherein the determined set of component carriers only includes a specific component carrier when the request includes one bit.

41. The apparatus of claim 37, wherein the determined set of component carriers includes a predetermined component carrier when the request includes two bits.

42. The apparatus of claim 37, wherein the determined set of component carriers includes the component carriers in a first set of component carriers or a second set of component carriers configured semi-statically through radio resource control (RRC) signaling when the request includes two bits and the two bits indicate that the CSI report is triggered for the first set of component carriers or the second set of component carriers.

43. The apparatus of claim 37, wherein the request includes five bits for indicating any subset of five component carriers for which to provide the feedback.

44. The apparatus of claim 37, wherein the at least one processor is further configured to determine the set of component carriers for which to send feedback based on one or more of an uplink subframe number, a system frame number, or a combination thereof when the request includes one bit.

45. The apparatus of claim 37, wherein the at least one processor is further configured to: receive a cyclic shift for demodulation reference signals (DM-RS) from an uplink grant; and determine the set of component carriers for which to send feedback based on the received cyclic shift when the report includes one bit.

46. The apparatus of claim 45, wherein the at least one processor is further configured to determine the set of component carriers for which to send feedback based at least in part on a received reserved modulation and coding scheme (MCS) index.

47. The apparatus of claim 37, wherein the at least one processor is further configured to determine the set of component carriers for which to send feedback based on whether a physical downlink shared channel (PDSCH) is received on a component carrier in the same subframe as the received request when the request includes one bit.

48. The apparatus of claim 37, wherein the at least one processor is further configured to determine the set of component carriers for which to send feedback based on a carrier indicator field (CIF) in a received physical downlink control channel (PDCCH) in the same subframe as the received request, wherein the received PDCCH includes a downlink grant for scheduling a physical downlink shared channel (PDSCH) and the CIF indicates a component carrier for which the received PDCCH applies when the request includes one bit.

49. The apparatus of claim 37, wherein the at least one processor is further configured to determine the set of component carriers for which to send feedback based on a subset of bits of a resource allocation field when the request includes one bit.

50. The apparatus of claim 37, wherein the at least one processor is further configured to determine the set of component carriers for which to send feedback based on information configured semi-statically through radio resource control (RRC) signaling when the request includes one bit.

51. An apparatus for wireless communication, comprising:
at least one processor configured to:
transmit a request for a channel state information (CSI) report for a set of component carriers of a plurality of component carriers; and
receive the CSI report including feedback for each component carrier in the set of component carriers when the request comprises a plurality of bits for indicating the set of component carriers; and
a memory coupled to the at least one processor.

52. The apparatus of claim 51, wherein the request includes one bit only for indicating one component carrier of the plurality of component carriers.

53. The apparatus of claim 51, wherein the plurality of bits indicate no component carriers, a predetermined component carrier, or a first set of component carriers or a second set of component carriers configured semi-statically through radio resource control (RRC) signaling.

54. The apparatus of claim 53, wherein the at least one processor is further configured to configure the first set of component carriers and the second set of component carriers semi-statically through radio resource control (RRC) signaling before transmitting the request with the plurality of bits.

55. A computer program product, comprising:
a non-transitory computer-readable medium including instructions stored thereon for causing a computer to:
receive a request for a channel state information (CSI) report for at least one component carrier of a plurality of component carriers;
determine a set of component carriers based at least in part on the request when the request comprises a plurality of bits; and
transmit the CSI report including feedback for each component carrier in the determined set of component carriers.

56. A computer program product, comprising:
a non-transitory computer-readable medium including instructions stored thereon for causing a computer to:
transmit a request for a channel state information (CSI) report for a set of component carriers of a plurality of component carriers; and
receive the CSI report including feedback for each component carrier in the set of component carriers when the request comprises a plurality of bits for indicating the set of component carriers.

* * * * *